(12) United States Patent
Takeda et al.

(10) Patent No.: US 8,913,009 B2
(45) Date of Patent: *Dec. 16, 2014

(54) SPATIALLY-CORRELATED MULTI-DISPLAY HUMAN-MACHINE INTERFACE

(75) Inventors: Genyo Takeda, Kyoto (JP); Howard Cheng, Sammamish, WA (US)

(73) Assignee: Nintendo Co., Ltd., Kyoto (JP)

( * ) Notice: Subject to any disclaimer, the term of this patent is extended or adjusted under 35 U.S.C. 154(b) by 519 days.

This patent is subject to a terminal disclaimer.

(21) Appl. No.: 13/153,106

(22) Filed: Jun. 3, 2011

(65) Prior Publication Data

US 2011/0285704 A1 Nov. 24, 2011

Related U.S. Application Data

(63) Continuation-in-part of application No. 13/019,924, filed on Feb. 2, 2011, and a continuation-in-part of application No. 13/019,928, filed on Feb. 2, 2011, now Pat. No. 8,317,615.

(30) Foreign Application Priority Data

| Feb. 3, 2010 | (JP) | 2010-022022 |
|---|---|---|
| Feb. 3, 2010 | (JP) | 2010-022023 |
| Aug. 6, 2010 | (JP) | 2010-177893 |
| Aug. 20, 2010 | (JP) | 2010-185315 |
| Aug. 30, 2010 | (JP) | 2010-192220 |
| Aug. 30, 2010 | (JP) | 2010-192221 |
| Nov. 1, 2010 | (JP) | 2010-245298 |
| Nov. 1, 2010 | (JP) | 2010-245299 |

(51) Int. Cl.
*G09G 5/08* (2006.01)
(Continued)

(52) U.S. Cl.
CPC ..... *H04N 21/4854* (2013.01); *H04N 21/42202* (2013.01); *H04N 21/4781* (2013.01);
(Continued)

(58) Field of Classification Search
USPC .................. 345/156–178; 463/30–32, 36–38
See application file for complete search history.

(56) References Cited

U.S. PATENT DOCUMENTS

| 4,210,329 A | 7/1980 | Steiger et al. |
| 5,009,501 A | 4/1991 | Fenner et al. |

(Continued)

FOREIGN PATENT DOCUMENTS

| CN | 1868244 | 11/2006 |
| CN | 202355827 | 8/2012 |

(Continued)

OTHER PUBLICATIONS

Apple Support, "iPhone—Technical Specifications", http://support.apple.com/kb/SP2, Feb. 19, 2010, 3 pages.

(Continued)

*Primary Examiner* — Stephen Sherman
(74) *Attorney, Agent, or Firm* — Nixon & Vanderhye P.C.

(57) ABSTRACT

A human-machine interface involves plural spatially-coherent visual presentation surfaces at least some of which are movable by a person. Plural windows or portholes into a virtual space, at least some of which are handheld and movable, are provided by using handheld and other display devices. Aspects of multi-dimensional spatiality of the moveable window (e.g., relative to another window) are determined and used to generate images. As one example, the moveable window can present a first person perspective "porthole" view into the virtual space, this porthole view changing based on aspects of the moveable window's spatiality in multi-dimensional space relative to a stationary window. A display can present an image of a virtual space, and an additional, moveable display can present an additional image of the same virtual space. Technology is used to determine aspects of the spatiality of the display devices in the physical world, and use the determined spatiality to affect the images displayed on the displays. For example, determined spatiality of the movable display relative to another display can be used to provide relative spatiality of images the two displays present to enhance the user's immersive perception. The movable display can context-switch between pointer functionality and spatial functionality depending on whether it is pointing toward a stationary display.

26 Claims, 32 Drawing Sheets

(51) Int. Cl.
  *G06F 3/033* (2013.01)
  *H04N 21/422* (2011.01)
  *H04N 21/478* (2011.01)
  *H04N 21/485* (2011.01)
  *A63F 13/40* (2014.01)
  *A63F 13/20* (2014.01)

(52) U.S. Cl.
  CPC ... *A63F 2300/6676* (2013.01); *A63F 2300/301* (2013.01); *A63F 2300/105* (2013.01); *A63F 13/10* (2013.01); *A63F 13/06* (2013.01); *A63F 2300/403* (2013.01)
  USPC .......................................... 345/158; 463/32

(56) References Cited

U.S. PATENT DOCUMENTS

| | | | |
|---|---|---|---|
| 5,440,326 A | 8/1995 | Quinn |
| 5,452,104 A | 9/1995 | Lee |
| 5,602,566 A | 2/1997 | Motosyuku et al. |
| 5,608,449 A | 3/1997 | Swafford, Jr. et al. |
| 5,619,397 A | 4/1997 | Honda et al. |
| 5,825,350 A | 10/1998 | Case, Jr. et al. |
| 5,825,352 A | 10/1998 | Bisset et al. |
| 5,943,043 A | 8/1999 | Furuhata et al. |
| 6,020,891 A | 2/2000 | Rekimoto |
| 6,069,790 A | 5/2000 | Howell et al. |
| 6,084,584 A | 7/2000 | Nahi et al. |
| 6,084,594 A | 7/2000 | Goto |
| 6,104,380 A | 8/2000 | Stork et al. |
| 6,126,547 A | 10/2000 | Ishimoto |
| 6,164,808 A | 12/2000 | Shibata et al. |
| 6,183,365 B1 | 2/2001 | Tonomura et al. |
| 6,201,554 B1 | 3/2001 | Lands |
| 6,208,329 B1 | 3/2001 | Ballare |
| 6,238,291 B1 | 5/2001 | Fujimoto et al. |
| 6,252,153 B1 | 6/2001 | Toyama |
| 6,254,481 B1 | 7/2001 | Jaffe |
| 6,323,846 B1 | 11/2001 | Westerman et al. |
| 6,340,957 B1 | 1/2002 | Adler et al. |
| 6,347,290 B1 | 2/2002 | Bartlett |
| 6,379,249 B1 | 4/2002 | Satsukawa et al. |
| 6,396,480 B1 | 5/2002 | Schindler et al. |
| 6,400,376 B1 | 6/2002 | Singh et al. |
| 6,411,275 B1 | 6/2002 | Hedberg |
| 6,425,822 B1 | 7/2002 | Hayashida et al. |
| 6,466,198 B1 | 10/2002 | Feinstein |
| 6,466,831 B1 | 10/2002 | Shibata et al. |
| 6,498,860 B1 | 12/2002 | Sasaki et al. |
| 6,500,070 B1 | 12/2002 | Tomizawa et al. |
| 6,509,896 B1 | 1/2003 | Saikawa et al. |
| 6,538,636 B1 | 3/2003 | Harrison |
| 6,540,610 B2 | 4/2003 | Chatani |
| 6,540,614 B1 | 4/2003 | Nishino et al. |
| 6,557,001 B1 | 4/2003 | Dvir et al. |
| 6,567,068 B2 | 5/2003 | Rekimoto |
| 6,567,101 B1 | 5/2003 | Thomas |
| 6,567,984 B1 | 5/2003 | Allport |
| 6,570,557 B1 | 5/2003 | Westerman et al. |
| 6,582,299 B1 | 6/2003 | Matsuyama et al. |
| 6,657,627 B1 | 12/2003 | Wada et al. |
| 6,690,358 B2 | 2/2004 | Kaplan |
| 6,716,103 B1 | 4/2004 | Eck et al. |
| 6,798,429 B2 | 9/2004 | Bradski |
| 6,834,249 B2 | 12/2004 | Orchard |
| 6,847,351 B2 | 1/2005 | Noguera |
| 6,856,259 B1 | 2/2005 | Sharp |
| 6,888,536 B2 | 5/2005 | Westerman et al. |
| 6,897,833 B1 | 5/2005 | Robinson et al. |
| 6,908,386 B2 | 6/2005 | Suzuki et al. |
| 6,921,336 B1 | 7/2005 | Best |
| 6,930,661 B2 | 8/2005 | Uchida et al. |
| 6,933,923 B2 | 8/2005 | Feinstein |
| 6,939,231 B2 | 9/2005 | Mantyjarvi et al. |
| 6,954,491 B1 | 10/2005 | Kim et al. |
| 6,966,837 B1 | 11/2005 | Best |
| 6,988,097 B2 | 1/2006 | Shirota |
| 6,990,639 B2 | 1/2006 | Wilson |
| 6,993,451 B2 | 1/2006 | Chang et al. |
| 7,007,242 B2 | 2/2006 | Suomela et al. |
| 7,023,427 B2 | 4/2006 | Kraus et al. |
| 7,030,856 B2 | 4/2006 | Dawson et al. |
| 7,030,861 B1 | 4/2006 | Westerman et al. |
| 7,038,662 B2 | 5/2006 | Noguera |
| 7,053,887 B2 | 5/2006 | Kraus et al. |
| 7,068,294 B2 | 6/2006 | Kidney et al. |
| 7,088,342 B2 | 8/2006 | Rekimoto et al. |
| 7,109,978 B2 | 9/2006 | Gillespie et al. |
| 7,115,031 B2 | 10/2006 | Miyamoto et al. |
| 7,128,648 B2 | 10/2006 | Watanabe |
| 7,140,962 B2 | 11/2006 | Okuda et al. |
| 7,142,191 B2 | 11/2006 | Idesawa et al. |
| 7,158,123 B2 | 1/2007 | Myers et al. |
| 7,173,604 B2 | 2/2007 | Marvit et al. |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,184,020 B2 | 2/2007 | Matsui |
| 7,225,101 B2 | 5/2007 | Usuda et al. |
| 7,233,316 B2 | 6/2007 | Smith et al. |
| 7,254,775 B2 | 8/2007 | Geaghan et al. |
| 7,256,767 B2 | 8/2007 | Wong et al. |
| 7,271,795 B2 | 9/2007 | Bradski |
| 7,275,994 B2 | 10/2007 | Eck et al. |
| 7,280,096 B2 | 10/2007 | Marvit et al. |
| 7,285,051 B2 | 10/2007 | Eguchi et al. |
| 7,289,102 B2 | 10/2007 | Hinckley et al. |
| 7,295,191 B2 | 11/2007 | Kraus et al. |
| 7,301,526 B2 | 11/2007 | Marvit et al. |
| 7,301,527 B2 | 11/2007 | Marvit |
| 7,301,529 B2 | 11/2007 | Marvit et al. |
| 7,321,342 B2 | 1/2008 | Nagae |
| 7,333,087 B2 | 2/2008 | Soh et al. |
| RE40,153 E | 3/2008 | Westerman et al. |
| 7,339,580 B2 | 3/2008 | Westerman et al. |
| 7,352,358 B2 | 4/2008 | Zalewski et al. |
| 7,352,359 B2 | 4/2008 | Zalewski et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| 7,376,388 B2 | 5/2008 | Ortiz et al. |
| 7,389,591 B2 | 6/2008 | Jaiswal et al. |
| 7,391,409 B2 | 6/2008 | Zalewski et al. |
| 7,403,220 B2 | 7/2008 | MacIntosh et al. |
| 7,431,216 B2 | 10/2008 | Weinans |
| 7,446,731 B2 | 11/2008 | Yoon |
| 7,461,356 B2 | 12/2008 | Mitsutake |
| 7,479,948 B2 | 1/2009 | Kim et al. |
| 7,479,949 B2 | 1/2009 | Jobs et al. |
| 7,510,477 B2 | 3/2009 | Argentar |
| 7,518,503 B2 | 4/2009 | Peele |
| 7,519,468 B2 | 4/2009 | Orr et al. |
| 7,522,151 B2 | 4/2009 | Arakawa et al. |
| 7,540,011 B2 | 5/2009 | Wixson et al. |
| 7,552,403 B2 | 6/2009 | Wilson |
| 7,570,275 B2 | 8/2009 | Idesawa et al. |
| 7,607,111 B2 | 10/2009 | Vaananen et al. |
| 7,614,008 B2 | 11/2009 | Ording |
| 7,619,618 B2 | 11/2009 | Westerman et al. |
| 7,626,598 B2 | 12/2009 | Manchester |
| 7,647,614 B2 | 1/2010 | Krikorian et al. |
| 7,656,394 B2 | 2/2010 | Westerman et al. |
| 7,663,607 B2 | 2/2010 | Hotelling et al. |
| 7,667,707 B1 | 2/2010 | Margulis |
| 7,692,628 B2 | 4/2010 | Smith et al. |
| 7,696,980 B1 | 4/2010 | Piot et al. |
| 7,699,704 B2 | 4/2010 | Suzuki et al. |
| 7,705,830 B2 | 4/2010 | Westerman et al. |
| 7,710,396 B2 | 5/2010 | Smith et al. |
| 7,719,523 B2 | 5/2010 | Hillis |
| 7,721,231 B2 | 5/2010 | Wilson |

(56) References Cited

U.S. PATENT DOCUMENTS

| | | |
|---|---|---|
| 7,730,402 B2 | 6/2010 | Song |
| 7,736,230 B2 | 6/2010 | Argentar |
| 7,762,891 B2 | 7/2010 | Miyamoto et al. |
| 7,782,297 B2 | 8/2010 | Zalewski et al. |
| 7,791,808 B2 | 9/2010 | French et al. |
| 7,827,698 B2 | 11/2010 | Jaiswal et al. |
| 7,934,995 B2 | 5/2011 | Suzuki |
| 8,038,533 B2 | 10/2011 | Tsuchiyama et al. |
| 8,105,169 B2 | 1/2012 | Ogasawara et al. |
| 8,246,460 B2 | 8/2012 | Kitahara |
| 8,256,730 B2 | 9/2012 | Tseng |
| 8,317,615 B2 | 11/2012 | Takeda et al. |
| 8,337,308 B2 | 12/2012 | Ito et al. |
| 8,339,364 B2 | 12/2012 | Takeda et al. |
| 8,529,352 B2 | 9/2013 | Mae et al. |
| 8,613,672 B2 | 12/2013 | Mae et al. |
| 2001/0019363 A1 | 9/2001 | Katta et al. |
| 2002/0103026 A1 | 8/2002 | Himoto et al. |
| 2002/0103610 A1 | 8/2002 | Bachmann et al. |
| 2002/0107071 A1 | 8/2002 | Himoto et al. |
| 2002/0165028 A1 | 11/2002 | Miyamoto et al. |
| 2003/0027517 A1 | 2/2003 | Callway et al. |
| 2003/0207704 A1 | 11/2003 | Takahashi et al. |
| 2003/0216179 A1 | 11/2003 | Suzuki et al. |
| 2004/0023719 A1 | 2/2004 | Hussaini et al. |
| 2004/0092309 A1 | 5/2004 | Suzuki |
| 2004/0229687 A1 | 11/2004 | Miyamoto et al. |
| 2004/0266529 A1 | 12/2004 | Chatani |
| 2005/0176502 A1 | 8/2005 | Nishimura et al. |
| 2005/0181756 A1 | 8/2005 | Lin |
| 2006/0012564 A1 | 1/2006 | Shiozawa et al. |
| 2006/0015808 A1 | 1/2006 | Shiozawa et al. |
| 2006/0015826 A1 | 1/2006 | Shiozawa et al. |
| 2006/0038914 A1 | 2/2006 | Hanada et al. |
| 2006/0077165 A1 | 4/2006 | Jang |
| 2006/0094502 A1 | 5/2006 | Katayama et al. |
| 2006/0174026 A1 | 8/2006 | Robinson et al. |
| 2006/0250764 A1 | 11/2006 | Howarth et al. |
| 2006/0252537 A1 | 11/2006 | Wu |
| 2006/0252541 A1 | 11/2006 | Zalewski et al. |
| 2006/0267928 A1 | 11/2006 | Kawanobe et al. |
| 2007/0021216 A1 | 1/2007 | Guruparan |
| 2007/0049374 A1 | 3/2007 | Ikeda et al. |
| 2007/0060383 A1 | 3/2007 | Dohta |
| 2007/0202956 A1 | 8/2007 | Ogasawara et al. |
| 2007/0252901 A1 | 11/2007 | Yokonuma et al. |
| 2007/0265085 A1 | 11/2007 | Miyamoto et al. |
| 2008/0015017 A1 | 1/2008 | Ashida et al. |
| 2008/0024435 A1 | 1/2008 | Dohta |
| 2008/0030458 A1 | 2/2008 | Helbing et al. |
| 2008/0100995 A1 | 5/2008 | Ryder et al. |
| 2008/0150911 A1 | 6/2008 | Harrison |
| 2008/0220867 A1 | 9/2008 | Zalewski et al. |
| 2008/0300055 A1 | 12/2008 | Lutnick et al. |
| 2009/0143140 A1 | 6/2009 | Kitahara |
| 2009/0183193 A1 | 7/2009 | Miller, IV |
| 2009/0225159 A1 | 9/2009 | Schneider et al. |
| 2009/0256809 A1 | 10/2009 | Minor |
| 2009/0280910 A1 | 11/2009 | Gagner et al. |
| 2009/0322671 A1 | 12/2009 | Scott et al. |
| 2009/0322679 A1 | 12/2009 | Sato et al. |
| 2010/0007926 A1 | 1/2010 | Imaizumi et al. |
| 2010/0045666 A1 | 2/2010 | Kornmann et al. |
| 2010/0083341 A1 | 4/2010 | Gonzalez |
| 2010/0149095 A1 | 6/2010 | Hwang |
| 2010/0156824 A1 | 6/2010 | Paleczny et al. |
| 2011/0021274 A1 | 1/2011 | Sato et al. |
| 2011/0190049 A1 | 8/2011 | Mae et al. |
| 2011/0190050 A1 | 8/2011 | Mae et al. |
| 2011/0190052 A1 | 8/2011 | Takeda et al. |
| 2011/0190061 A1 | 8/2011 | Takeda et al. |
| 2011/0195785 A1 | 8/2011 | Ashida et al. |
| 2011/0285704 A1 | 11/2011 | Takeda et al. |
| 2011/0287842 A1 | 11/2011 | Yamada et al. |
| 2011/0295553 A1 | 12/2011 | Sato |
| 2012/0001048 A1 | 1/2012 | Takahashi et al. |
| 2012/0015732 A1 | 1/2012 | Takeda et al. |
| 2012/0026166 A1 | 2/2012 | Takeda et al. |
| 2012/0040759 A1 | 2/2012 | Ito et al. |
| 2012/0044177 A1 | 2/2012 | Ohta et al. |
| 2012/0046106 A1 | 2/2012 | Ito et al. |
| 2012/0052952 A1 | 3/2012 | Nishida et al. |
| 2012/0052959 A1 | 3/2012 | Nishida et al. |
| 2012/0062445 A1 | 3/2012 | Haddick et al. |
| 2012/0068927 A1 | 3/2012 | Poston et al. |
| 2012/0088580 A1 | 4/2012 | Takeda et al. |
| 2012/0106041 A1 | 5/2012 | Ashida et al. |
| 2012/0106042 A1 | 5/2012 | Ashida et al. |
| 2012/0108329 A1 | 5/2012 | Ashida et al. |
| 2012/0108340 A1 | 5/2012 | Ashida et al. |
| 2012/0119992 A1 | 5/2012 | Nishida et al. |
| 2012/0258796 A1 | 10/2012 | Ohta et al. |
| 2012/0270651 A1 | 10/2012 | Takeda et al. |
| 2013/0063350 A1 | 3/2013 | Takeda et al. |
| 2013/0109477 A1 | 5/2013 | Ito et al. |

FOREIGN PATENT DOCUMENTS

| | | |
|---|---|---|
| EP | 0 835 676 | 4/1998 |
| EP | 1 723 992 | 11/2006 |
| FR | 2 932 998 | 1/2010 |
| FR | 2932998 | 1/2010 |
| JP | 09-294260 | 11/1997 |
| JP | 10-341388 | 12/1998 |
| JP | 2000-222185 | 8/2000 |
| JP | 2002-248267 | 9/2002 |
| JP | 2004-032548 | 1/2004 |
| JP | 3703473 | 2/2005 |
| JP | 2005-269399 | 9/2005 |
| JP | 3770499 | 4/2006 |
| JP | 3797608 | 7/2006 |
| JP | 2006-350986 | 12/2006 |
| JP | 2007-061271 | 3/2007 |
| JP | 2007-075353 | 3/2007 |
| JP | 2007-075751 | 3/2007 |
| JP | 2007-289413 | 11/2007 |
| JP | 2008-264402 | 11/2008 |
| JP | 2009-178363 | 8/2009 |
| JP | 2009-247763 | 10/2009 |
| JP | 2010-017412 | 1/2010 |
| JP | 4601925 | 12/2010 |
| TW | M278452 | 10/2005 |
| TW | 419388 | 1/2011 |
| WO | 03/007117 | 1/2003 |
| WO | 03/083822 | 10/2003 |
| WO | 2007-128949 | 11/2007 |
| WO | 2007/143632 | 12/2007 |
| WO | 2007-143632 | 12/2007 |
| WO | 2008-136064 | 11/2008 |
| WO | 2009-038596 | 3/2009 |

OTHER PUBLICATIONS

Extended European Search Report issued in EP Application No. 11176479.1 on Nov. 24, 2011.

Extended European Search Report issued in EP Application No. 11176478.3 on Nov. 24, 2011.

Extended European Search Report issued in EP Application No. 11176477.5 on Nov. 24, 2011.

Extended European Search Report issued in EP Application No. 11176475.9 on Nov. 24, 2011.

Apple Support, "iPhone—Technical Specifications", http://support.apple.com/kb/SP2, 2010. 3 pages.

Apple Support, "iPhone—Technical Specifications", Apple, Aug. 22, 2008, XP002673788, retrieved from the internet: URL: http://support.apple.com/kb/SP495 [retrieved on Apr. 13, 2012].

PersonalApplets: "Gyro Tennis App for iPhone 4 and iPod Touch 4$^{th}$ gen" YouTube, Aug. 9, 2010, Hyyp://www.youtube.com/watch?v=c7PRFbqWKIs, 2 pages.

Jhrogersii, "Review: Gyro Tennis for iPhone", iSource, Sep. 17, 2010, http://isource.com/2010/09/17/review-gyro-tennis-for-phone/, 10 pages.

(56) References Cited

OTHER PUBLICATIONS

English-language machine translation for JP 4601925.
Mae et al., U.S. Appl. No. 13/017,381, filed Jan. 31, 2011.
Mae et al., U.S. Appl. No. 13/017,527, filed Jan. 31, 2011.
Takeda et al., U.S. Appl. No. 13/019,924, filed Feb. 2, 2011.
Takeda et al., U.S. Appl. No. 13/019,928, filed Feb. 2, 2011.
Takeda et al., U.S. Appl. No. 13/145,690, filed Dec. 19, 2011.
Ito et al., U.S. Appl. No. 13/198,251, filed Aug. 4, 2011.
Ashida et al., U.S. Appl. No. 13/206,059, filed Aug. 9, 2011.
Ashida et al., U.S. Appl. No. 13/206,767, filed Aug. 10, 2011.
Ashida et al., U.S. Appl. No. 13/206,914, filed Aug. 10, 2011.
Ashida et al., U.S. Appl. No. 13/207,867, filed Aug. 11, 2011.
Ito et al., U.S. Appl. No. 13/208,719, filed Aug. 12, 2011.
Ohta et al., U.S. Appl. No. 13/209,756, filed Aug. 15, 2011.
Nishida et al., U.S. Appl. No. 13/211,679, filed Aug. 17, 2011.
Nishida et al., U.S. Appl. No. 13/212,648, filed Aug. 18, 2011.
Takeda et al., U.S. Appl. No. 13/244,685, filed Sep. 26, 2011.
Takeda et al., U.S. Appl. No. 13/244,710, filed Sep. 26, 2011.
Ohta et al., U.S. Appl. No. 13/354,000, filed Jan. 19, 2012.
Takeda et al., U.S. Appl. No. 13/541,282, filed Jul. 3, 2012.
Patent Examination Report dated Jun. 25, 2013 in counterpart Australian Application No. 2011213764.
Rob Aspin et al., "Augmenting the CAVE: An initial study into close focused, inward looking, exploration in IPT systems," 11th IEEE International Symposiumon Distributed Simulation and Real-Time Applications, pp. 217-224 (Oct. 1, 2007).
D. Weidlich et al., "Virtual Reality Approaches for Immersive Design," CIRP Annals, Elsevier BV, NL, CH, FR, vol. 56, No. 1, pp. 139-142 (Jan. 1, 2007).
G.W. Fitzmaurice et al, "Virtual Reality for Palmtop Computers," ACM Transactions on Information Systems, ACM, New York, NY, vol. 11, No. 3, pp. 197-218 (Jul. 1, 1993).
Johan Sanneblad et al, "Ubiquitous graphics," Proceedings of the Working Conference on Advanced Visual Interfaces, AVI '06, pp. 373-377 (0/01/2006).
Extended European Search report, EP12 000 320.7 (Nov. 13, 2012).
IGN Staff, "PS3 Games on PSP?", URL: http://www.ign.com/articles/2006/10/25/ps3-games-on-psp, Publication date printed on article: Oct. 2006.
Marcusita, "What Benefits Can I Get Out of My PSP on My PS3", URL: htip://web.archive.org/web/200 80824222755/http://forums.afterdawn.com/thread_view.cfm/600615, Publication date printed on article: Dec. 15, 2007.
Office Action dated Oct. 16, 2012 in Australian Application No. 2011204815.
Office Action dated Sep. 18, 2012 in Australian Application No. 2011213764.
Office Action dated Sep. 10, 2012 in Australian Application No. 2011213765.
English-language machine translation for JP 2002-248267.
English-language machine translation for JP 2007-075751.
English-language machine translation for JP 2008-264402.
Sony HMZ-T1 with TrackIR 5 playing PC games! WoW and Skyrim Uploaded by iphwne Nov. 16, 2011 http://www.youtube.com/watch?v=5OLCFMBWT6I.
Sony's New 3D OLED Headset/VR Goggles Uploaded by TheWaffleUniverse Jan. 8, 2011 http://www.youtube.com/watch?v=UoE5ij63EDI.
TrackIR 5—review Uploaded by arnycracker8 Jan. 27, 2011 http://www.youtube.com/watch?v=EXMXvAuBzo4.
Partial English-language translation of TWM278452.
Mae et al., U.S. Appl. No. 13/017,381, filed Jan. 31, 2011—now USP 8,613,672.
Mae et al., U.S. Appl. No. 13/017,527, filed Jan. 31, 2011—now USP 8,529,352.
Takeda et al., U.S. Appl. No. 13/019,924, filed Feb. 2, 2011—non-final office action mailed Oct. 8, 2013.
Takeda et al., U.S. Appl. No. 13/019,928, filed Feb. 2, 2011—now USP 8,317,615.
Takeda et al., U.S. Appl. No. 13/145,690, filed Dec. 19, 2011—allowed.
Ito et al., U.S. Appl. No. 13/198,251, filed Aug. 4, 2011—awaiting USPTO action.
Ashida et al., U.S. Appl. No. 13/206,059, filed Aug. 9, 2011—awaiting USPTO action.
Ashida et al., U.S. Appl. No. 13/206,767, filed Aug. 10, 2011—Quayle action mailed Nov. 14, 2013.
Ashida et al., U.S. Appl. No. 13/206,914, filed Aug. 10, 2011—allowed.
Ashida et al., U.S. Appl. No. 13/207,867, filed Aug. 11, 2011—non-final office action mailed Oct. 7, 2013.
Ito et al., U.S. Appl. No. 13/208,719, filed Aug. 12, 2011—now USP 8,337,308.
Ohta et al., U.S. Appl. No. 13/209,756, filed Aug. 15, 2011—awaiting USPTO action.
Nishida et al., U.S. Appl. No. 13/211,679, filed Aug. 17, 2011—final office action mailed Oct. 15, 2013.
Nishida et al., U.S. Appl. No. 13/212,648, filed Aug. 18, 2011—final office action mailed Dec. 2, 2013.
Takeda et al., U.S. Appl. No. 13/244,685, filed Sep. 26, 2011—now USP 8,339,364.
Takeda et al., U.S. Appl. No. 13/244,710, filed Sep. 26, 2011—non-final office action mailed Sep. 24, 2013.
Ohta et al., U.S. Appl. No. 13/354,000, filed Jan. 19, 2012—non-final office action mailed Nov. 8, 2013.
Takeda et al., U.S. Appl. No. 13/541,282, filed Jul. 3, 2012—non-final office action mailed Sep. 13, 2013.
Takeda et al., U.S. Appl. No. 13/672,862, filed Nov. 9, 2012—awaiting USPTO action.
Ito et al., U.S. Appl. No. 13/687,057, filed Nov. 28, 2012—allowed.
Communication Pursuant to Article 94(3) EPC dated Dec. 12, 2013, issued in corresponding European Application No. 12000320.7.
English-language machine translation for JP 2009-178363.
English-language machine translation for JP 2009-247763.
English-language machine translation for JP 09-294260, 1997.
English-language machine translation for JP 2004-032548.
International Search Report for PCT/JP2011/000565 (Dated Mar. 8, 2011).
International Search Report for PCT/JP2011/000566 (Dated Mar. 8, 2011).

Game space
(This image is from upper side just for illustrative purposes and not displayed)

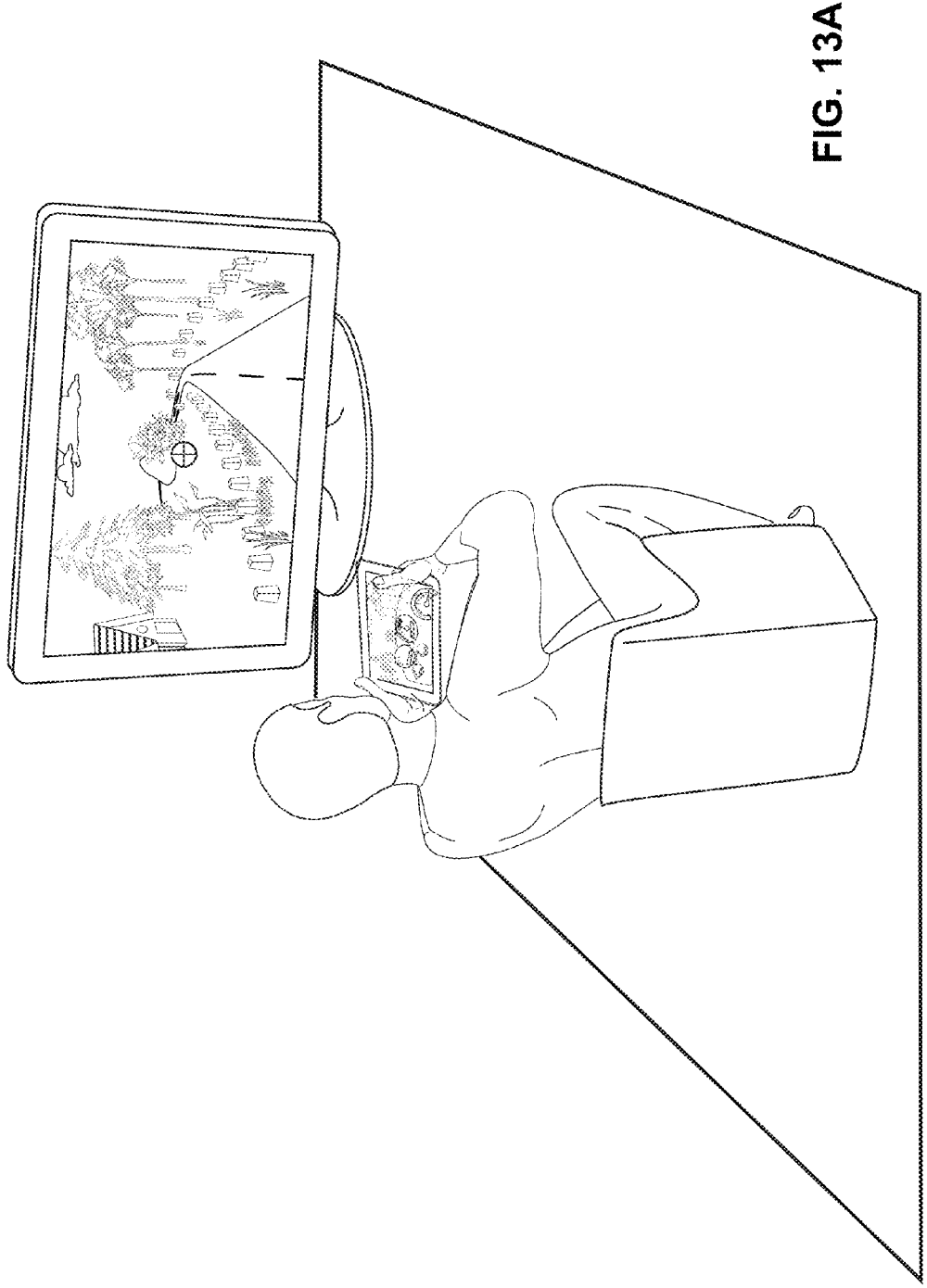

SPATIALLY-CORRELATED MULTI-DISPLAY HUMAN-MACHINE INTERFACE

CROSS-REFERENCES TO RELATED APPLICATIONS

This application is a continuation-in-part of U.S. patent application Ser. No. 13/019,924 and a continuation-in-part of U.S. patent application Ser. No. 13/019,928, each filed on Feb. 2, 2011, and each of which claims benefit under 35 U.S.C. Section 119 of the following Japanese Patent Applications: 2010-022022 and 2010-022023 filed Feb. 3, 2010; 2010-177893 filed Aug. 6, 2010; 2010-185315 filed Aug. 20, 2010; 2010-192220 and 2010-192221 filed Aug. 30, 2010; and 2010-245298 and 2010-245299 filed Nov. 1, 2010 The contents of all of these US and Japanese applications are incorporated by reference herein in their entirety.

FIELD

The technology herein relates to human-machine interfaces, and more particularly to interactive graphical computer interfaces with multiple display surfaces. Still more particularly, the technology herein relates to immersive, intuitive, interactive multi-display human-machine interfaces offering plural spatially-correlated displays (e.g., handheld and other) to enhance the user experience through virtual spatiality.

BACKGROUND AND SUMMARY

We humans exist in three-dimensional space. We know where we are within the 3D world that surrounds us. Turn your head to the left. Now turn it to the right. Look up. Look down. You have just determined your place within the 3D environment of the room.

Ever since computer graphics became interactive, people have been trying to create human-machine interfaces that provide the same sort of immersive spatial experience we get from looking around the real world. As one example, systems are known that provide users with inertially-sensed head-mounted displays that allow them to look around and interact with a so-called CAVE virtual environment. See e.g., Buxton et al, *HMD's, Caves & Chameleon: A Human-Centric Analysis of Interaction in Virtual Space*, Computer Graphics: The SIGGRAPH Quarterly, 32(4), 64-68 (1998). However, some kinds of head mounted displays can restrict the user's field of view or otherwise impair a person's ability to interact with the real world.

Flat screen televisions and other such displays common in many homes today can be used to display a virtual world. They provide a reasonably immersive environment with high resolution or high definition at low cost, and most consumers already own one. Some are even "3D" (e.g., through use of special glasses) to provide apparent image depth. The person watching or otherwise interacting with a television or other such display typically at least generally faces it and can see and interact with the virtual environment it presents. Other people in the room can also see and may be able to interact. These displays are wonderful for displaying immersive content but, unlike stereo or theater sound, they generally do not wrap around or envelop the user. Wrap-around projected or other displays are known (see e.g., Blanke et al, "Active Visualization in a Multidisplay Immersive Environment", Eighth Eurographics Workshop on Virtual Environments (2002)), but may be too expensive for home use. Further innovations are possible.

Some non-limiting example implementations of technology herein provide a movable (e.g., handholdable) window or porthole display surface into a virtual space. Aspects of multi-dimensional spatiality of the moveable display surface relative to another e.g., stationary display are determined and used to generate images while at least some spatial aspects of the plural displays are correlated. As one non-limiting example, the moveable display can present a first person perspective "porthole" view into the virtual space, this porthole view changing based on aspects of the moveable display's spatiality in multi-dimensional space relative to a stationary display providing a contextual spatial reference for the user.

In one non-limiting aspect, a human-machine interface involves plural visual presentation surfaces at least some of which are movable. For example, a display can present an image of a virtual space, and another, moveable display can present an additional image of the same virtual space but from a potentially different viewpoint, viewing perspective, field of view, scale, image orientation, augmentation and/or other image characteristic or aspect.

The non-limiting movable display can selectively display an additional image of the virtual space and/or other user interface information (e.g., text, graphics or video relating or auxiliary to the images the other display presents) depending on the movable display's attitude relative to the other display.

In some example implementations, the movable display can act under some circumstances as a pointing device. When pointed/aimed at another display, the movable display's attitude can control or influence the position of a pointing symbol on the other display. When pointed/aimed away from the other display, the movable display can display a further image of the virtual space displayed on the other display, but from a different viewing direction that depends on the movable display's attitude.

Technology is used to determine aspects of the spatiality of at least one of the display devices in the physical world, and to use the determined spatiality aspects to present appropriately-viewpointed, -viewing-perspectived, -directioned and/or other characteristic images on the displays. As one non-limiting example, determined spatiality of the movable display relative to a stationary or other display can be used to provide relative spatiality of images the plural displays present.

One example non-limiting implementation provides an immersive spatial human-machine interface comprising at least one handheld display movable in free space; an arrangement configured to determine at least some aspects of the attitude of the movable handheld display; at least one additional display; and at least one graphical image generator operatively coupled to the handheld display and the additional display, the at least one graphical image generator generating images of a virtual space for display by each of the handheld display and the additional display, wherein the at least one graphical image generator generates images from different viewing directions images of different perspectives (viewing) from a same or similar virtual location, viewing point, neighborhood, vantage point, neighborhood, vicinity, region or the like, for display by the handheld display and the additional display at least in part in response to the determined attitude aspects to provide spatial correlation between the two images and thereby enhance the immersive spatiality of the human-machine interface.

Such a non-limiting example interface may further provide that when two images are practically similar, the image presented by the handheld display is substituted by other image(s) and/or associated information. In this context, "practically similar" may include or mean similar or the same or nearly the same from the perception of the user who is viewing the two displays.

In some implementations, the additional display comprises a relatively large stationary display, and the at least one graphical image generator does not practically alter the rendering perspective (or viewpoint), except perhaps some marginal, peripheral or border-situation look-around perspective shifts, for images generated for the stationary display based on the determined attitude aspects.

BRIEF DESCRIPTION OF THE DRAWINGS

These and other features and advantages will be better and more completely understood from the following detailed description of exemplary non-limiting illustrative embodiments in conjunction with the drawings, of which:

FIGS. 13A and 13B show an example non-limiting virtual driving simulation user experience.

DETAILED DESCRIPTION OF NON-LIMITING EMBODIMENTS

Figure 1:
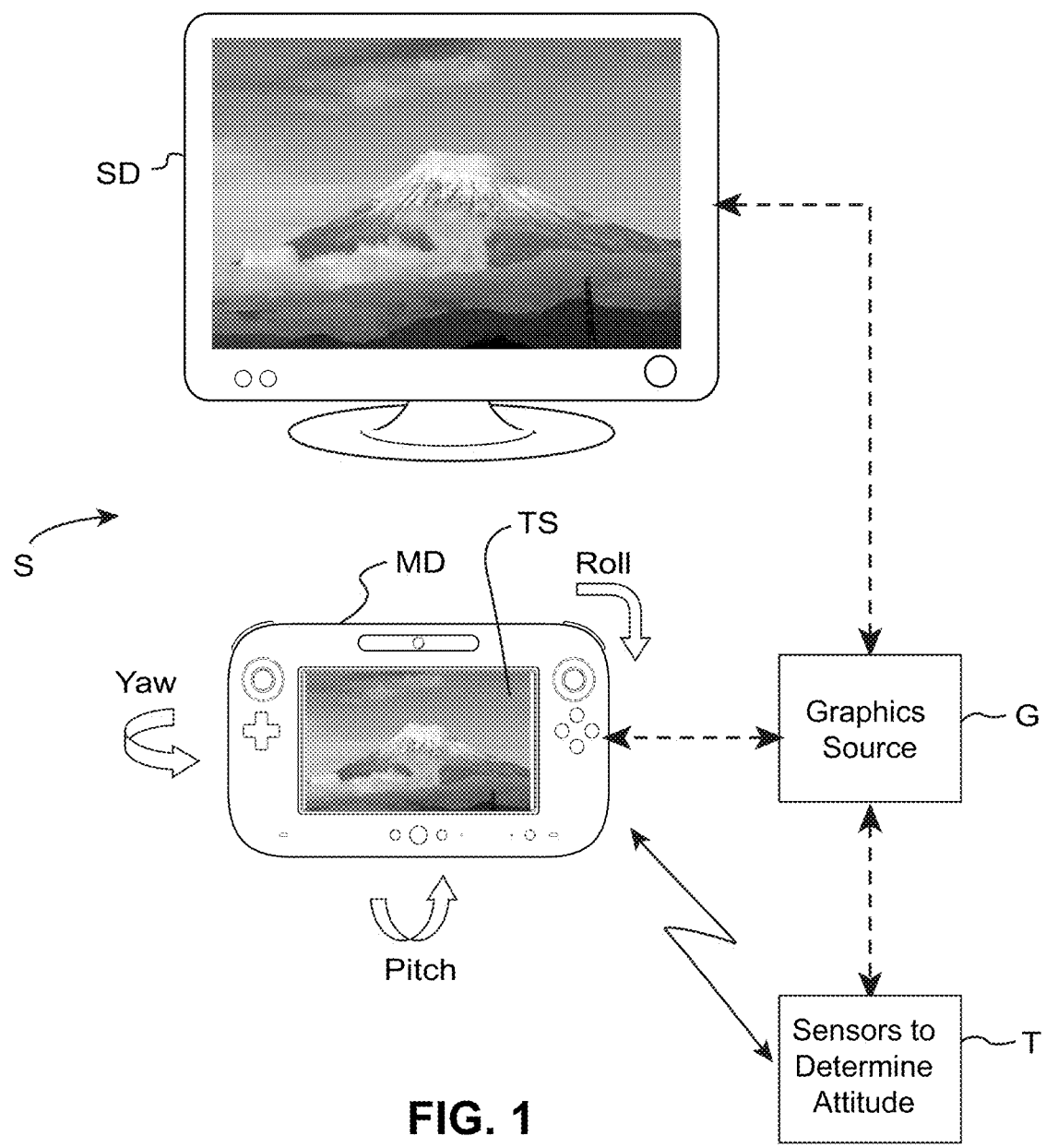
FIG. 1 shows an example non-limiting system including a movable display device and a stationary display device.

FIG. 1 shows an example non-limiting system S that provides a spatially-immersive interactive multi-display human-machine interface. Example non-limiting system S includes two display devices SD, MD, one movable (e.g., hand-holdable) and one stationary. The movable display MD in the example implementation is physically movable in free space during use, whereas the stationary display SD is relatively physically stationary in space during use. Of course, stationary displays SD such as home televisions can be moved from one place to another, but are generally not moved (or not moved much) during use. The relatively fixed position of stationary display SD provides physical correlation of the physical stationary display SD versus the movable display MD. Thus, "stationary" does not necessarily mean absolute immobility, but can encompass displays that are not generally moved (or not moved much) during use. In other non-limiting implementations, the stationary display SD can also be movable or partially movable.

One or more graphics source(s) G control or enable display devices SD, MD to display computer-generated or other images. In the non-limiting example shown, display devices SD, MD are spatially correlated to display respective aspects of a common virtual world for example from different viewpoints or viewing perspectives.

If display device SD is stationary, its location and attitude in 3D space can be assumed and need not be measured. Sensors T measure the attitude or other aspect(s) of potentially-changing spatiality of movable display device MD, e.g. using MARG ("Magnetic Angular Rate Gravity") technology.

The graphics source(s) G are configured to be responsive to information from the sensors T to control the images displayed on one or both of display devices SD, MD. For example, the graphics source(s) G may include, or be in communication with, processing circuitry that receives information from the sensors T and that controls the displayed images based on the received sensor information.

In example non-limiting implementations, the perspectives, viewpoints and/or viewing directions of images displayed by movable display device MD respond to the spatiality of the movable display device. In some instances, those image perspectives, viewing directions and/or viewpoints may be at least in part determined by apparent or actual relative spatiality of the two display devices SD, MD to continually spatially-correlate the two display presentations. The series of images presented on movable display MD thus are correlated in both space and time with the series images presented on stationary display SD in an example non-limiting implementation.

In one particular non-limiting example, physical display device SD is physically stationary in the room where it is located. It can for example be a relatively large fixed display (e.g., a wall or table mounted television or other display) used to present an image of a 3D virtual world—in this case a landscape including a breathtaking mountain. The images that display device SD displays can be static or dynamic. For example, they can be moving and/or animated (e.g., live action) images that dynamically change in various ways including viewpoint, e.g., in response to user input or other factors.

In the non-limiting example shown, display device MD is movable in free space. As movable display device MD is moved, it can display a movable image of the same virtual world as is displayed on the stationary display SD, but the image the movable display device displays of the virtual world is transformed based on aspects of the spatiality of movable display device MD. For example, the attitude of the movable display MD can be used to display the virtual world on the movable display from a different viewpoint, viewing perspective, viewing direction, field of view, image orientation, augmentation, scale and/or other image characteristic(s).

Figure 1A:
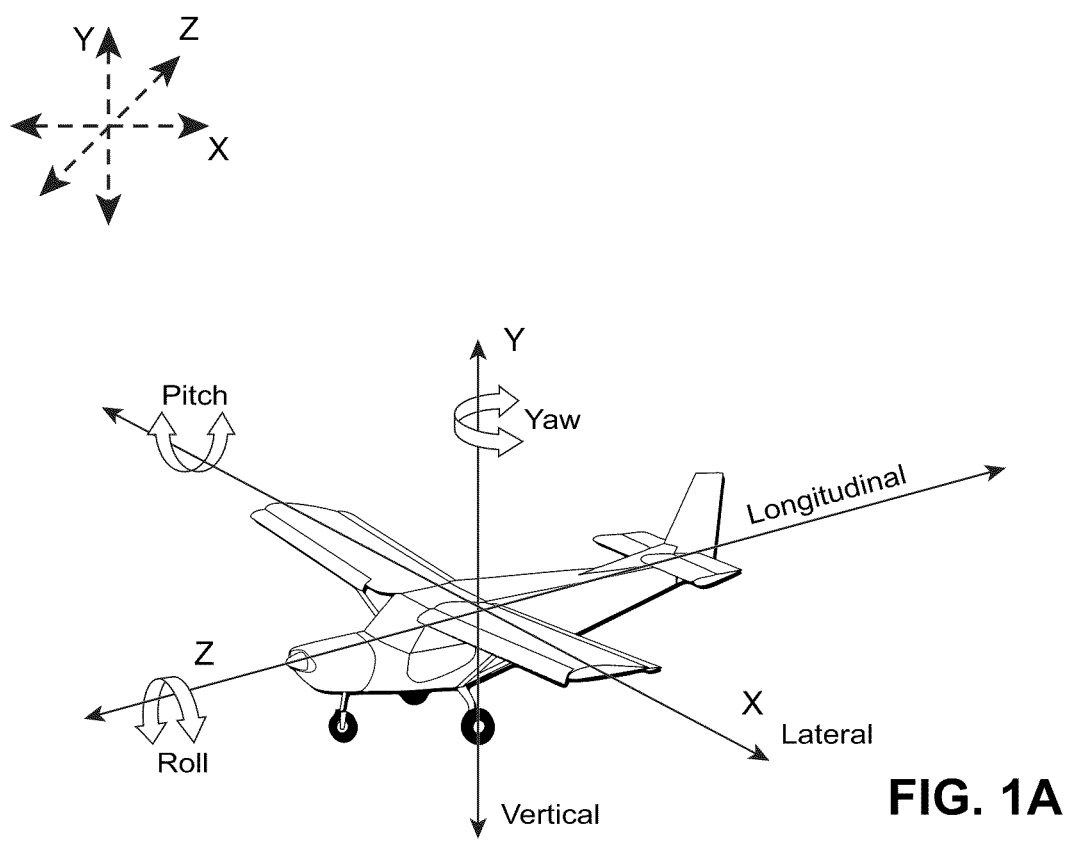
FIG. 1A illustrates an example movement of an object (in this case an airplane) in six degrees of freedom.

A human can move movable display device MD anywhere in free space. Moving an object anywhere in free space is sometimes called moving in "six degrees of freedom" (6DOF) because there are generally six basic ways an object can move (see FIG. 1A showing an airplane as an example):

1) Up/down,
2) Left/right,
3) Forward/backward,
4) pitch rotation (nose up or down),
5) yaw rotation (compass direction or heading during level flight), and
6) roll rotation (one or the other wing up).

For example, the person can move ("translate") display device MD along any of three orthogonal axes: up and down (vertical or "y"), left and right (horizontal or "x"), and forward and backward (depth or "z"). The person can rotate display device MD about any of three orthogonal rotational axes (pitch, yaw and roll). Just like any object, the person can simultaneously move display device MD in any combination of these "six degrees of freedom" to move display device MD in any direction and manner in three-dimensional space. For example, the person can spin display device MD about the roll (and/or any other) rotational axis at the same time she translates the device down or in any other direction(s)—like an airplane that rolls and descends at the same time, for example.

In the example non-limiting implementation, system S has sensors T that detect aspects of the spatiality of movable display MD such as its attitude. These sensors T may include one or more of accelerometers, gyrosensors, magnetometers, ultrasonic transducers, cameras, and the like. These sensors T enable movable display device MD to display corresponding different parts of the virtual world (e.g., the mountain) from different viewpoints, viewing perspectives, viewing directions or other characteristics responsive to aspects of the display device's current spatiality.

In one non-limiting example, the person can move display device MD to new attitudes that permit the person to examine different parts of the mountain. For example, to look at the base of the mountain, the person can move or rotate display device MD downward. One or more of the sensors T detect this downward movement such as translation and/or rotation, and the graphics source(s) G are responsive to the downward movement detection to display the base of the mountain on the movable display device MD. At the same time, the graphics source(s) G may continue to display the same view of the mountain on the stationary display device, thereby effectively providing a view that the person can intuitively use as a reference or context to understand that the display device MD is showing the base of the mountain and as a reference or context for further movement or rotation of display device MD to look at other parts of the mountain. For example, to look at the mountain's peak, the person can move or rotate the display device upwards.

In some non-limiting examples, the person can move display device MD to examine parts of the 3D virtual world that can't currently be seen on stationary display SD. For example, the person can turn display device MD to the left or the right, up or down, or away from stationary display device SD (e.g., so a ray projecting from the movable display device MD in a direction that is normal to the planar dimension of the movable display device does not intersect the stationary display SD) to visualize portions of the virtual world (e.g., other mountains, a mountain lake, a valley, a town, other side(s) of the same mountain, etc.) that cannot currently be seen on stationary display SD.

Thus, in one particular example, the stationary display SD acts as a spatial reference that orients the user within the 3D virtual space. It provides a perceptual context or anchor for the person using movable display device MD. Because the person can see both the stationary display SD and the movable display MD at the same time, the person's brain takes both images into account. If at least some aspects of the two images are spatially correlated, the person's brain can interpolate or interpret the two displayed images to be two windows or other views into the same virtual world. The movable display MD thus provides a 3D spatial effect that is not available merely from the image displayed by the stationary display SD.

Figure 14A:
FIGS. 14A and 14B show an example non-limiting virtual first person viewpoint user experience.
Figure 14B:

The image displayed on stationary display SD can be static or dynamic. For example, it is possible to use a joystick to move a character in a virtual reality database or space. For example, the analog stick can be used to change the direction of the first person player and can control the walk of a first person through the game. An example could be a virtual reality walkthrough. In this case, the stationary (e.g., TV) display will display the character's view or location as a moving scene. Manipulating controls on the movable display MD (or changing the attitude of the movable display housing) could for example cause system S to generate a series of images on stationary display SD, the images changing to show progression of a virtual character through the virtual scene. The changing images displayed on stationary display SD may thus be animated in some example non-limiting implementation to expose different objects, enemies, friends, and other virtual features as the virtual character moves through the 3D virtual space. See FIG. 14A. The user can in some implementations control the viewpoint and viewing direction of a virtual camera used to define the changing view in the 3D space. Once the virtual character stops and changes the attitude of the movable display MD is changed (see FIG. 14B), the user may have the option to see additional view of the virtual reality database on the movable display MD. For example, the user can "look around" or "rubber neck" in the virtual space by changing the attitude of the movable display MD to display views of the virtual space not currently displayed on the stationary display. It is possible for the virtual character to interactively move (walk or run) at the same time as the person can use the movable display MD to rubber neck or look around. While such looking around may perhaps most naturally occur once a virtual character has stopped moving within the virtual environment, it is possible to walk or otherwise move and rubberneck at same time.

System S thus provides a high degree of interactivity. By interacting with an additional, spatially-correlated viewing surface that the person can move anywhere in 3D space, the person becomes immersed within the virtual environment. She feels as if she is inside the virtual environment. She can look around, explore and discover new aspects of the virtual environment by rotating and/or translating the movable display MD (or herself while she is holding the movable display device). It is even possible for the person to rubberneck or look inquisitively around the virtual environment by looking about or survey with wonderment or curiosity. She can also interact with the virtual environment though additional user input arrangements on the movable display MD. For example, the movable display MD provides, in one non-limiting implementation, a touch screen TS that exposes a portion of the virtual environment to being directly manipulated (e.g., touched) by the person. See FIG. 8B. Meanwhile, because the stationary display SD continues to be in view, it continually provides a reference or contextual orienting anchor for the person as the person moves and further interacts with a handheld spatially-correlated patch of the virtual environment.

For example, suppose the person is virtually moving in the virtual space. The person can virtually walk through the virtual world (e.g., by controlling joystick or slider type controls on the movable display MD) and see corresponding changing images displayed on the stationary display SD that reflect the user's progress and travels through the virtual space. The person can at any time stop and look around. At this point, the system S can define two viewing angles from the approximately same location. In one example non-limiting implementation, the two displays (one on SD, the other on MD) can be based on the same or similar location but defined by two different viewing angles or perspectives.

In one non-limiting example, the size of movable display device touch screen TS is small enough so that movable display device MD is easily movable and holdable without fatigue, but large enough so the spatially-correlated patch of the 3D virtual world the movable display device MD presents is significant in affecting the person's spatial perception. Because the movable display device MD is much closer to the person's eyes than the stationary display SD, the person perceives it to be larger in her visual field of view. In fact, the person can hold the movable display device MD such that it may temporarily block or obscure her view of stationary display SD. Nevertheless, the stationary display SD remains present in the person's environment to be glanced at from time to time. It continues to anchor and orient the person's visual perception with a context that makes the spatially-correlated image displayed by movable display MD appear to be part of the same virtual environment that the stationary display SD displays. Generally speaking, watching a larger screen on stationary display SD is more comfortable because it is big. If the same, practically the same or similar images are displayed on the stationary display SD and movable display MD, most players will focus on the big screen rather than the small screen. In many non-limiting cases, a pointing cursor may be displayed on the stationary display SD as a pointing target. By changing the attitude of the movable display MD, it is possible to control the position of a pointing target within the display or other presentation area of the stationary display SD.

In this context, "practically similar" or "practically the same" can mean the same or nearly the same from the user's perspective. In one example implementation, processing is not necessarily conditional on the images being exactly the same. When the perspective is the same or similar from a user perspective, or when the situation is in range, then the processing will take place. In one non-limiting example, when "in range" (e.g., when a ray projecting from the movable display device MD in a direction that is normal to the planar dimension of the movable display device intersects the stationary display SD—or an assumed location of stationary display SD), the movable display will display different information. Thus, when the displays on the display devices would be essentially the same from the user's standpoint, the user can instead see something different on the movable display MD.

Figure 13B:
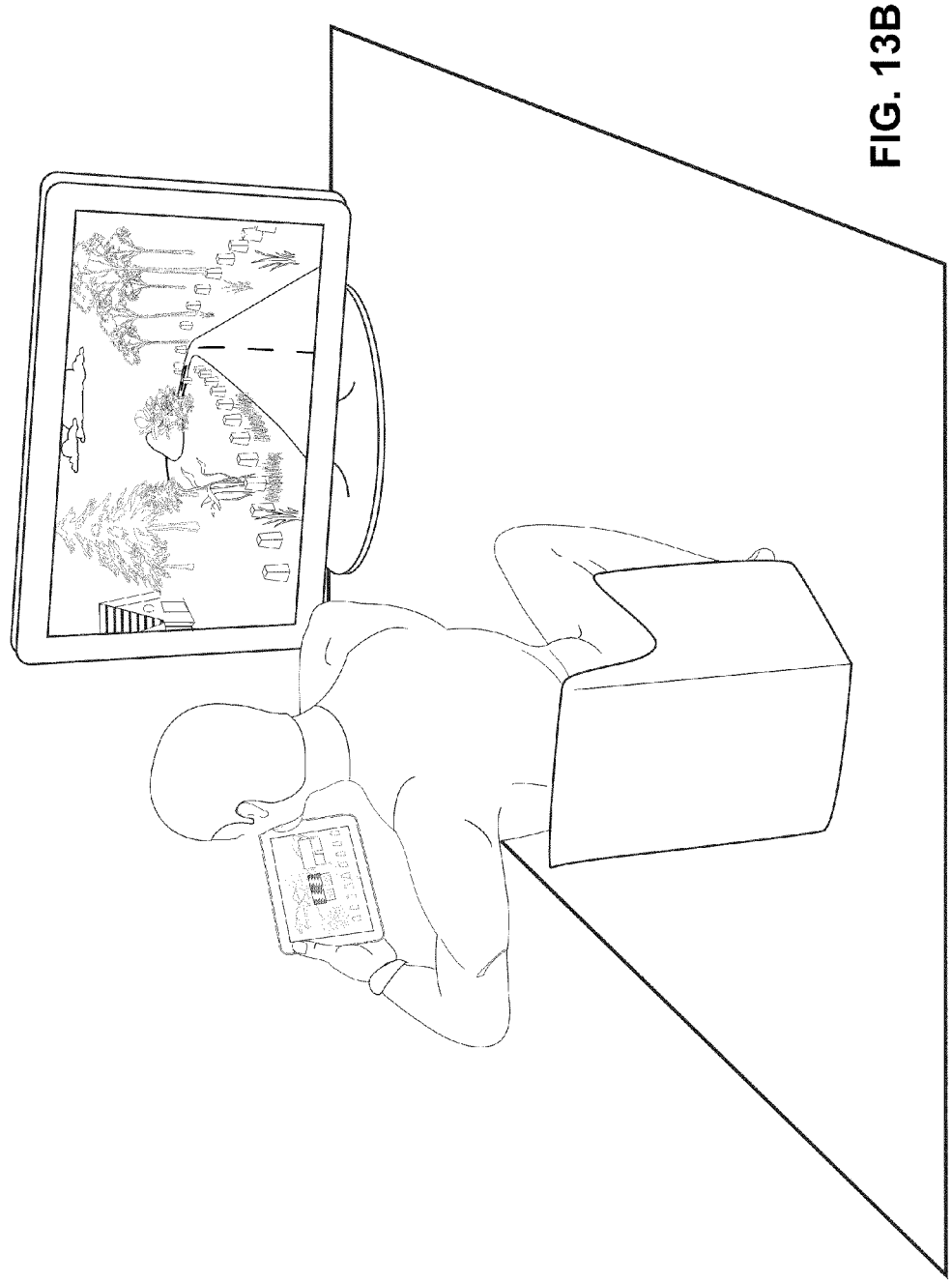

For example, in another non-limiting example (see FIGS. 13A-13B), the stationary display SD may display a driver's view out of the front windshield of a car driving down a country road. In this FIG. 13A example, the movable display device MD can display "dashboard information" such as speed, fuel level, and other such information. In some non-limiting examples, movable display device MD may display a dimmed or grayed-out version of all (or some portion) of what is displayed on the stationary display SD and the dashboard information may be overlaid onto the dimmed or grayed-out version. In other examples, the dashboard information may be overlaid onto some other background or on no background. Given this context or anchor presented on stationary display SD, a person may intuitively move and/or rotate movable display device MD to provide views of any passengers in the passenger's seat or back seat or the countryside as seen through the passenger's side or driver's side window. The user can thus look out the window (FIG. 13B), look behind the virtual vehicle, etc. The person feels as if he is inside a car as the car is moving down the road. System S can generate surround sound effects, tactile sensations or other perceptual information responsive to the spatiality that can add to this spatial immersive experience.

In many non-limiting cases, the relatively small movable display MD shows status such as for example selection of weapons or other items or status information. It is not necessary for the subject to continually watch the movable display, but at any desired time the subject can touch to select items, change items, etc. If something interesting happens on the big screen SD, e.g., sound and voices or some enemy flying up or flying away from the big screen, the person can change or move the movable display devices to a location that is "out of range" (e.g., when a ray projecting from the movable display device MD in a direction that is normal to the planar dimension of the movable display device does not intersect the stationary display SD—or an assumed location of stationary display SD), such as upwards, downwards or even backwards. A continuous area surrounding the stationary display SD's view will be displayed on the movable display MD, while keeping the stationary display in the same or similar location(s). The bigger screen of stationary display SD becomes an absolute or relative reference for the virtual world, allowing the person to turn back to or glance at the original place.

Illustrative Examples of Spatial Correlation Between the Displays

FIGS. 2A-7 illustrate example non-limiting spatial correlation between images the movable display MD and stationary display SD present. Some of these Figures show movable display MD by itself (as if the stationary display SD were not present or activated) in order to better explain how the movable display is interacting with the virtual environment, and then show spatial correlation between the movable and stationary displays.

Figure 2A:
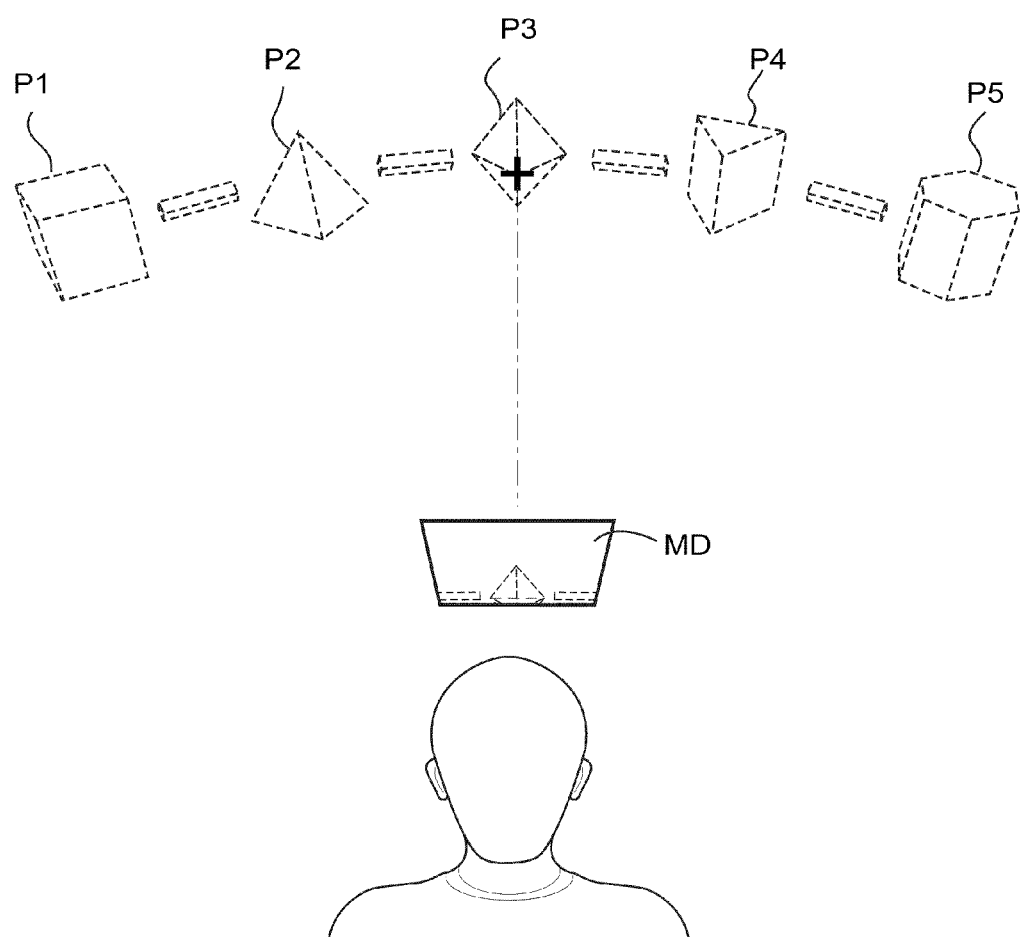
FIGS. 2A & 2B show example images presented on the example movable display device when the moveable display device translates vertically.
Figure 2B:
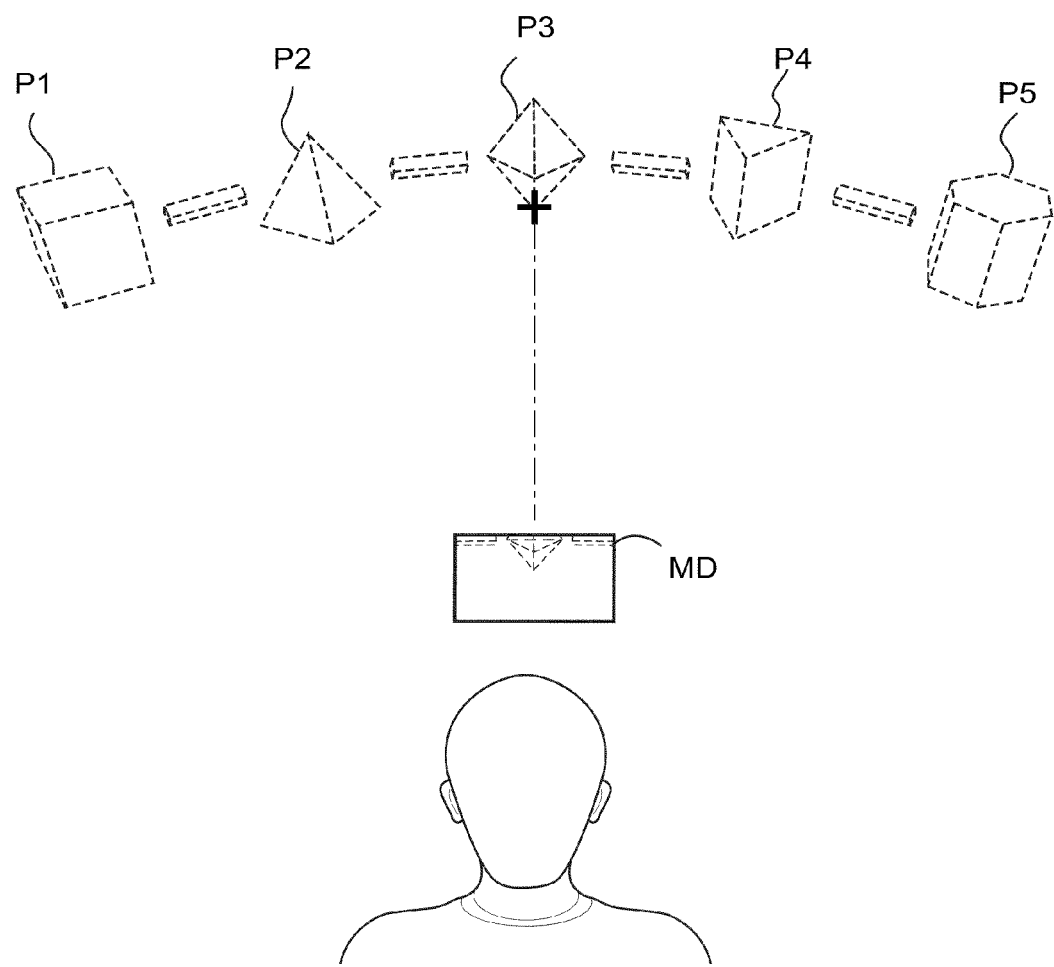

FIGS. 2A-2B show movable display device MD acting as a window into a simple 3D virtual world or space comprising a series of polygons P1-P5. The display device MD and the person are in the real 3D world; the polygons (P1-P5) shown in dotted exist in the virtual 3D world. This simplified illustration omits the person's arms and hands that may be holding the movable display device MD.

In the example non-limiting implementation, the real-world attitude of display device MD determines the virtual world viewpoint, viewing perspective or direction, or other viewing transformation for generating the image that display device MD displays. For example, FIG. 2A shows movable display MD displaying a perspective view of octahedron P3 with the octrahedron displayed near the bottom of the movable display MD viewing frame. Moving the display device MD downward in the y direction (see FIG. 2B) causes the image to shift to displaying the bottom part of the octrahedron near the top of the display device viewing frame. Thus, the change of spatiality of movable display device MD changes the viewpoint, viewing perspective or other viewing transformation into the virtual world used by system S to generate and present the display on the movable display device.

Figure 3A:
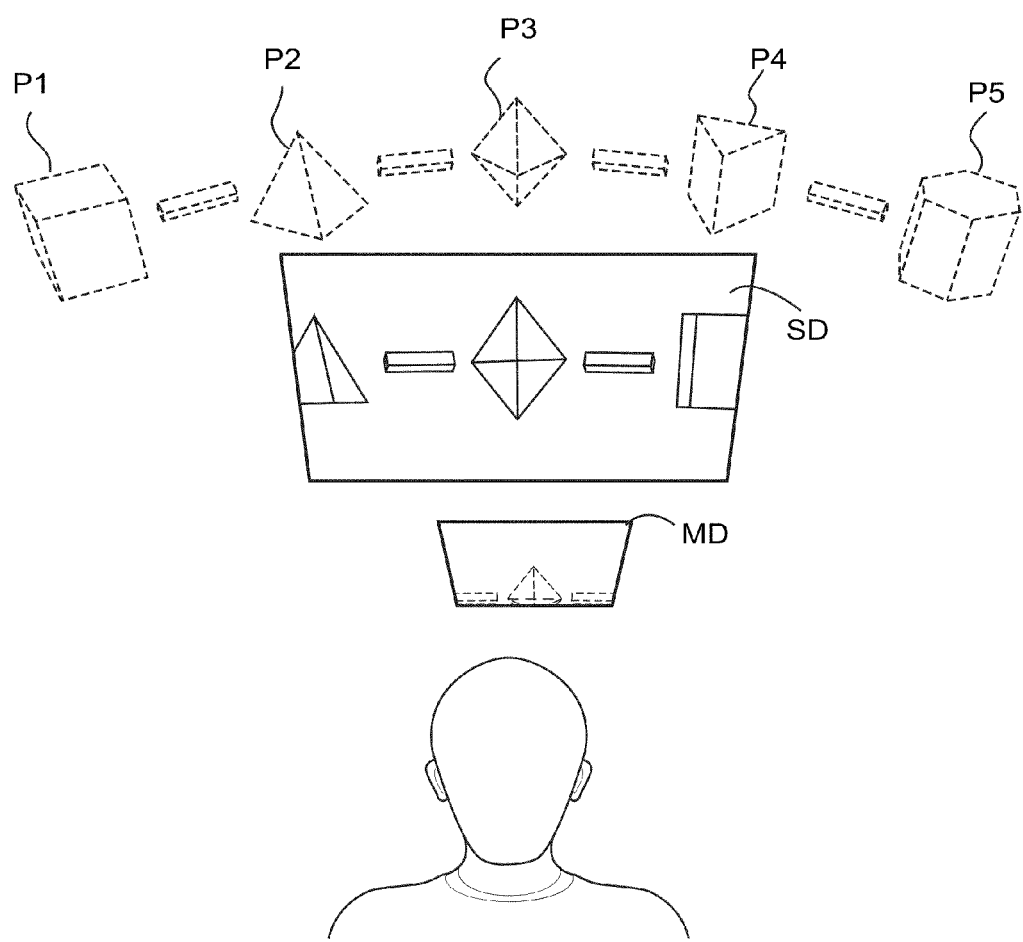
FIGS. 3A & 3B show example images presented on movable and stationary display devices when the movable display device translates vertically.
Figure 3B:
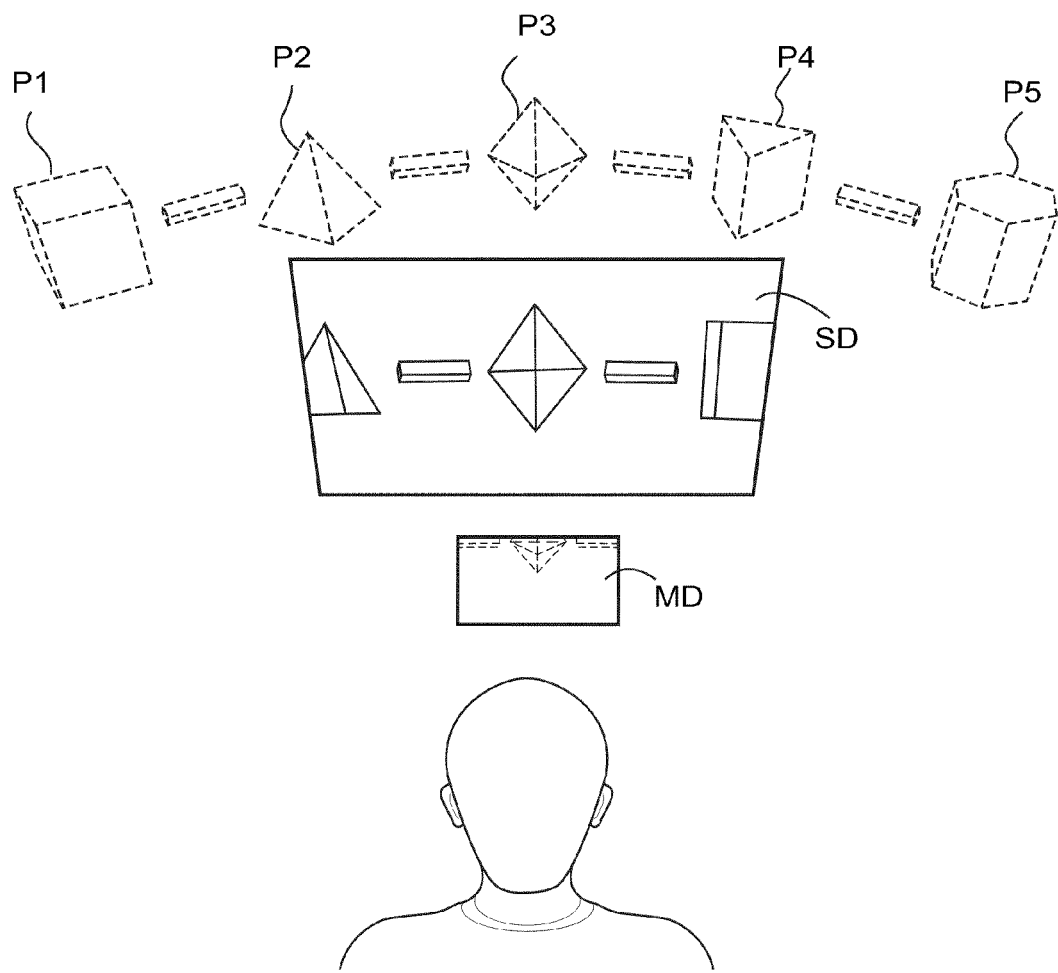

FIGS. 3A and 3B show the same situation but with stationary display SD now added. In one implementation, the viewpoint, viewing perspective or direction, or other viewing transformation into the 3D virtual world used to generate images for display by stationary display SD remain the same. In the example non-limiting implementation, the person is seeing both the image presented on movable display device MD and the image presented on stationary display device SD at the same time. Additionally, system S maintains at least some aspects of spatial correlation between the two displayed images as the person changes the orientation of the movable displayed image relative to the stationary displayed image. Thus, the person perceives that the portion of the virtual world displayed on movable display device MD exhibits spatiality relative to the part of the virtual world displayed on stationary display SD. In particular, the change of spatiality is sensed by sensors T and graphics source(s) G controls or enables movable display device MD to display a part of the octahedron that intuitively corresponds to this spatiality change. The effect is remarkable, highly intuitive, immersive and interactive. Especially if stationary display device SD is relatively large (e.g., a modern large screen LCD, plasma or projection type display) and the 3D graphics generation employed is close to photorealistic, the person accepts the image the stationary display device SD displays as a virtual reality and accepts the image displayed by movable display MD as a movable patch or piece of that same virtual reality. The patch that movable display MD displays is multi-dimensional in the sense that at least from the user's perception, system S maintains spatial correlation between the patch and the image the stationary display SD displays no matter how the person moves the movable display.

The image the stationary display device SD displays can itself be interactive and animated (e.g., live action), adding to the sense of realism. The patch displayed on movable display MD can also be interactive and animated (e.g., live action). While the person may feel immersed to some degree in a large stationary display presentation (and immersion can be improved by providing 3D effects and interactivity), immersiveness of the stationary display device SD is substantially enhanced through the addition of a spatially-correlated image patch displayed on the movable display MD.

Movable display device MD is closer to the person, so it can also be quite immersive despite its relatively small yet adequate size. It may also display animated interactive images responsive to user input. In one example embodiment, the person can control the viewpoint, viewing perspective, viewing direction or other viewing transformation of movable display device MD into the virtual 3D world by moving the movable display device. Moving display device MD provides an interactive view into the virtual world that changes in view as the person moves her body, head, etc. This functionality allows the person to enjoy a high degree of immersive interactivity with the virtual 3D world—an effect that is substantially enhanced by the omnipresence of stationary display SD which provides a larger immersive image orienting the user within the same virtual world. In one example implementation, the person has her own private porthole into the animated virtual 3D world without the need to wear restrictive gear such as a head mounted display or special glasses.

Furthermore, the user in some applications can directly interact with the patch the movable display MD displays. As one example, system S can simulate the user touching parts of the virtual world by placing a finger or stylus on the movable display MD. See FIG. 8B, 8E.

For example, moving display device MD from the attitude shown in FIG. 3A to the attitude shown in FIG. 3B changes the content of the image it displays relative to the image the stationary display device SD continues to display. In both cases, the movable display device MD may display what appears to be a subset of the part of the virtual world displayed by stationary display device SD. However, the particular subset changes depending on where the person moves movable display device MD. In some example implementations, moving the movable display device MD downward changes the virtual camera viewpoint, viewing perspective, viewing angle or viewing transformation used to generate the image displayed on movable display device MD so that the bottom rather than the top of the octahedron displayed on the stationary display SD is now displayed on the movable display MD. In other implementations, movable display MD may selectively display a subset of the virtual space or it may instead or in addition display other information (e.g., menus, scores, statistics, supplemental text, or other auxiliary information) e.g., depending on the attitude of the movable display relative to the stationary display SD.

Additionally, during such usage in some non-limiting embodiments, movable display MD may act as a pointing device to specify the position of a pointing object the stationary display SD displays. If a ray normal to the movable display MD intersects an assumed location of the stationary display SD, system S may use aspects of the attitude of movable display MD to control the position of a pointing object such as a cursor, site or other indicator on the stationary display SD.

Figure 4A:
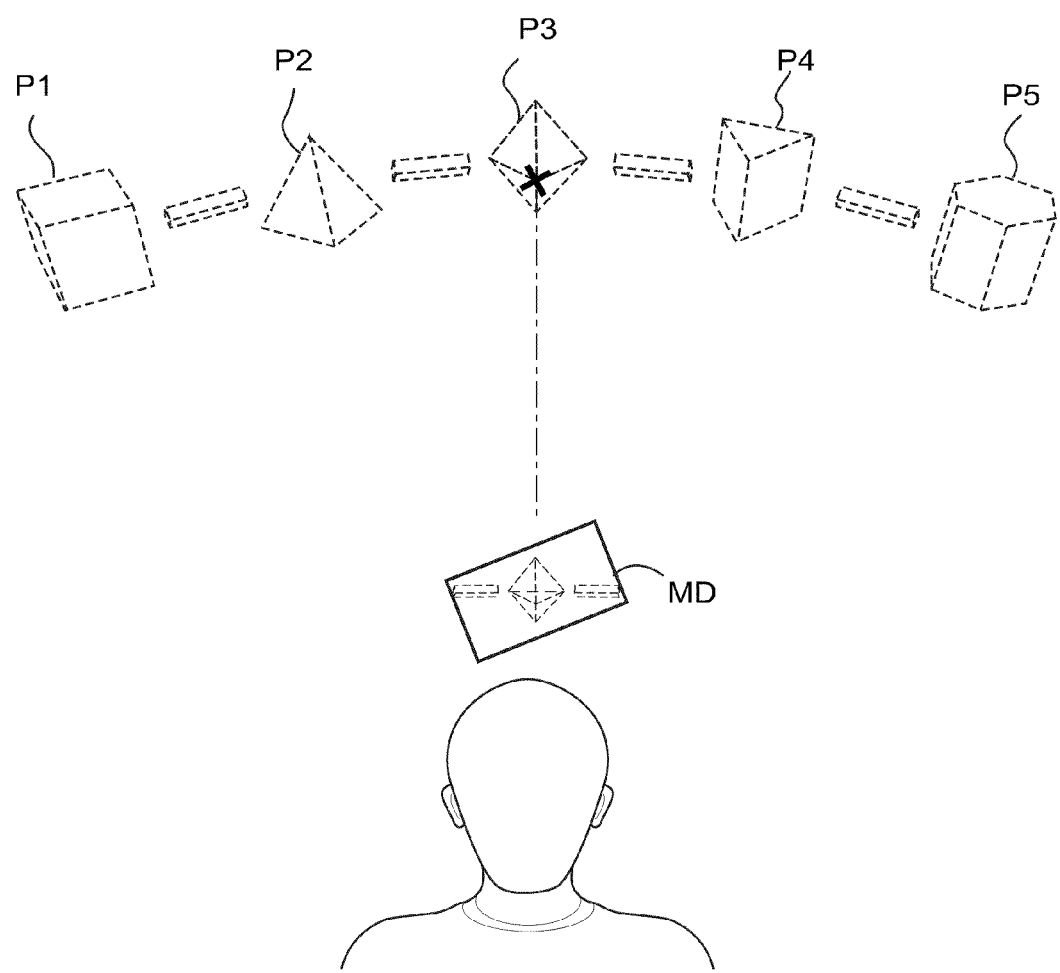
FIGS. 4A & 4B show example images presented on the moveable display device when the movable display device rotates about a roll axis.
Figure 4B:
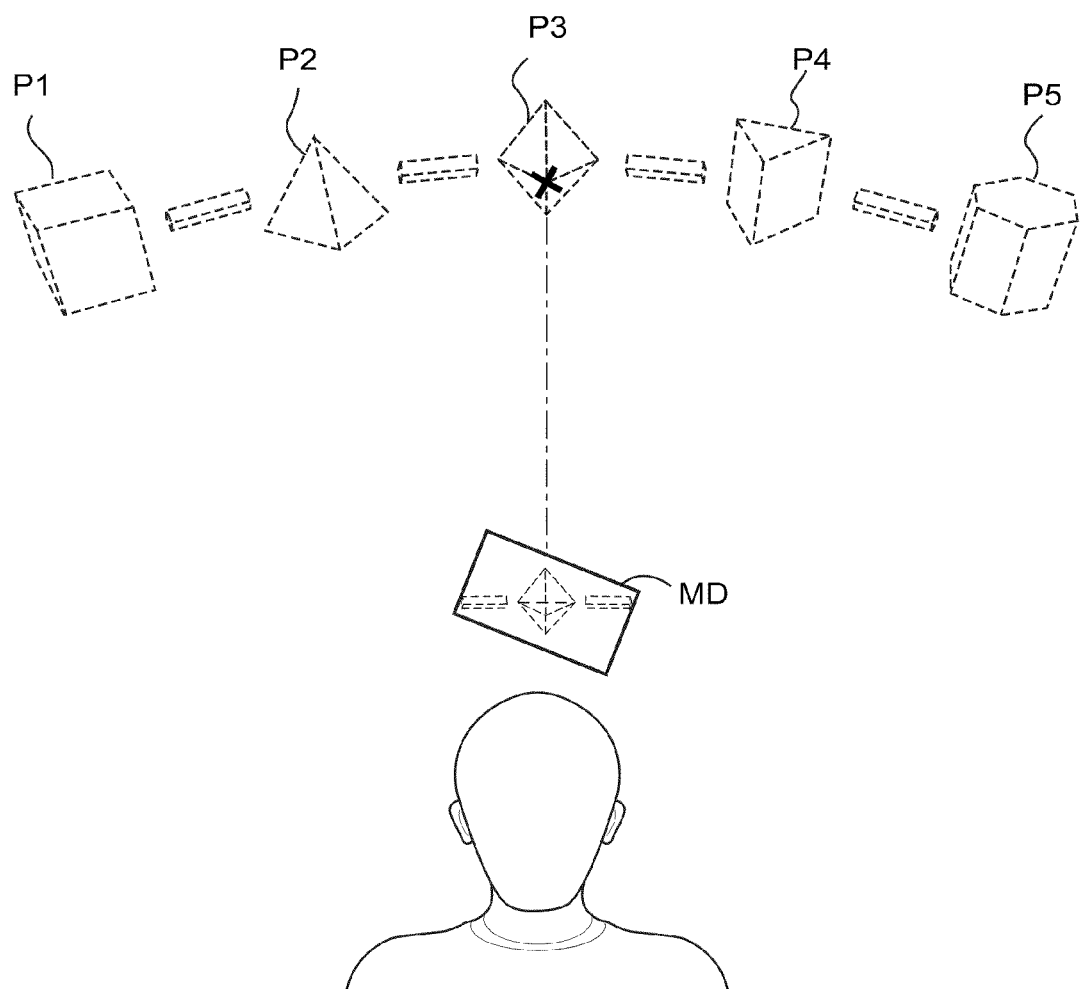

As an additional example, FIGS. 4A and 4B show what may happen when the person rotates movable display device MD about the roll axis. Before and after the rotation, the person sees the octrahedron displayed on the movable display device MD in the same orientation as if the person were able to view the virtual 3D world. In this particular example, when the person's viewpoint through movable display device MD would intersect the part of the virtual space the stationary display SD displays, the movable display seems to act as a transparent window into the virtual world—although in some implementations the image the movable display device displays can be enhanced or augmented in some way. Rotating movable display device MD in the pitch or roll directions could in some applications change the 3D perspective of the image the movable display presents so that from the user's eye perspective the illusion of a transparent window is maintained. Further rotating the movable display MD so the user would expect the window to expose perspectives or objects not currently displayed on the stationary display SD can expose such additional objects or perspectives in spatial consistency with the attitude of the movable display device. These objects can be still or animated or a combination.

Figure 5A:
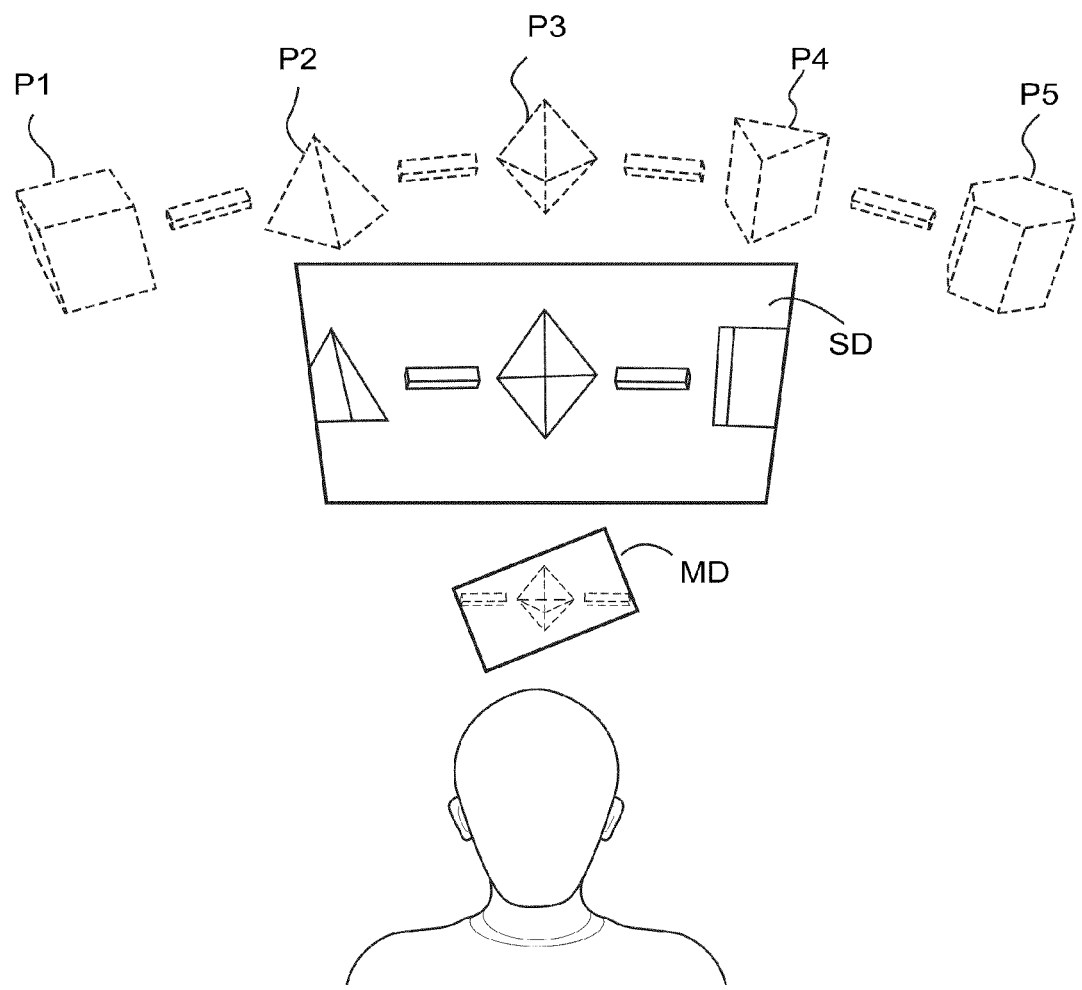
FIGS. 5A & 5B show example images presented on movable and stationary display devices when the movable display device rotates about a roll axis.
Figure 5B:
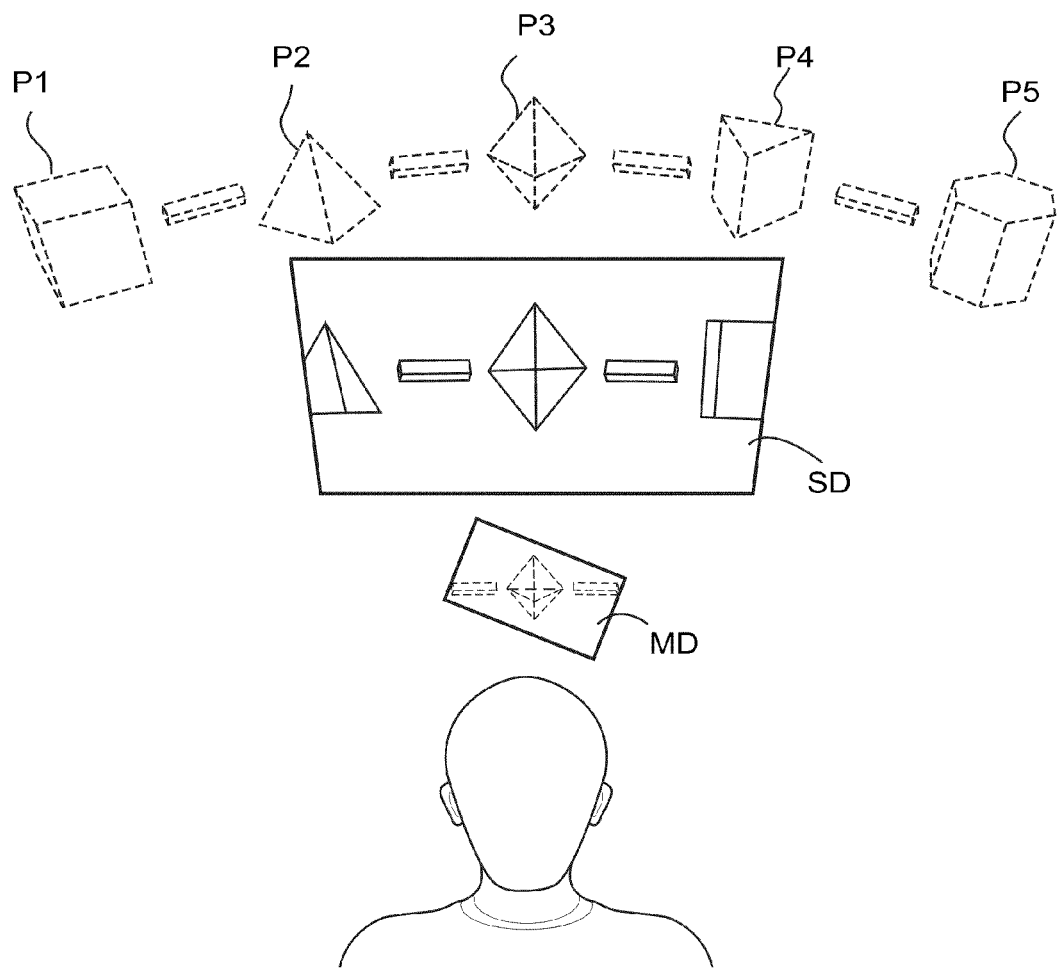

FIGS. 5A and 5B illustrate that in one example implementation, this is the same octrahedron orientation displayed on the stationary display SD. Such display functionality thus preserves the illusion that the movable display MD is a personal porthole or window through which the person can peer into the virtual world. In some implementations, rather than duplicate the view of part of stationary display SD on the movable display MD, the movable display can be used to display other information (e.g., text, graphics, instructions, input fields, etc.) whenever the view of the virtual world that movable display MD would otherwise display depending on its spatiality is coextensive with a view the stationary display SD already is presenting. In still other implementations, the other information displayed by movable display MD may be an augmentation overlaid onto a view of the virtual world the movable display presents based on at least some aspects of its attitude.

Figure 6:
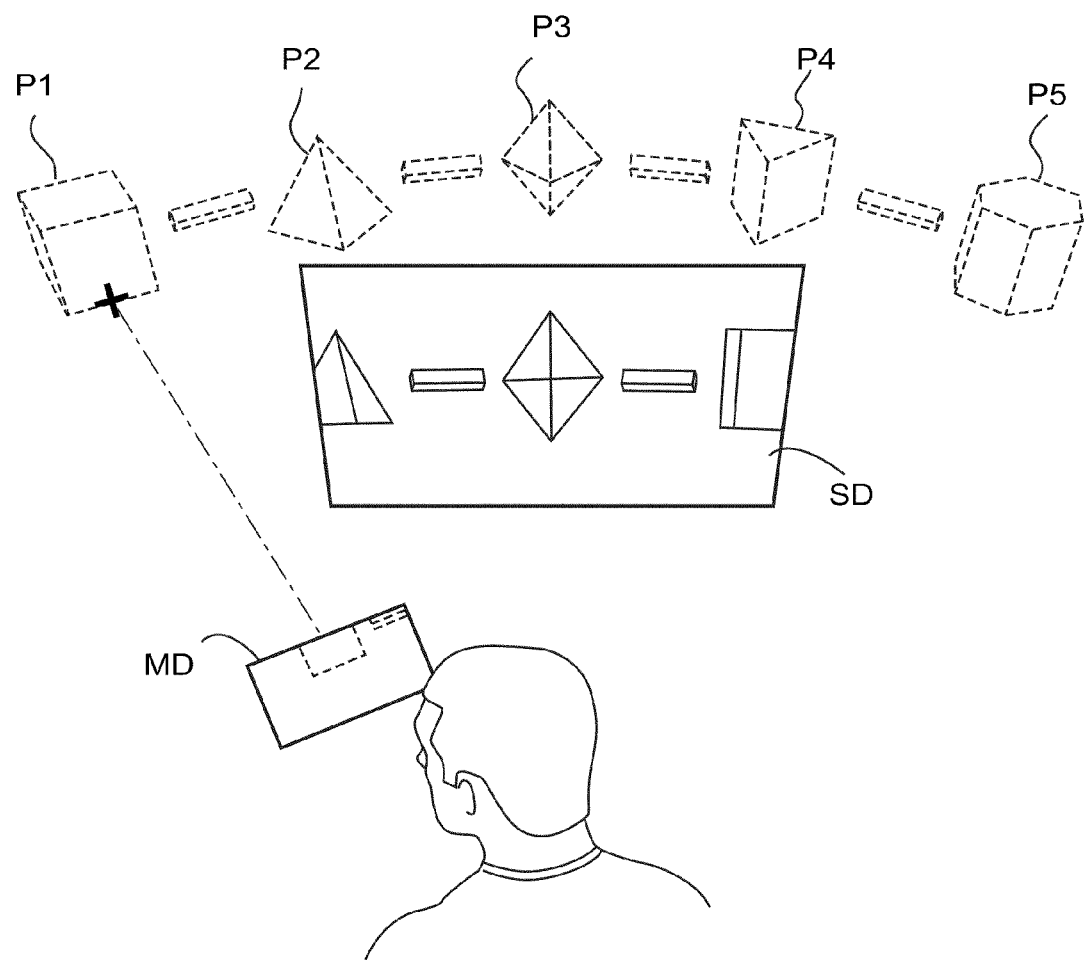
FIG. 6 shows an example image presented on movable and stationary display devices when the movable display device rotates about a yaw axis orthogonal to the roll axis.

FIG. 6 shows an example of moving the movable display device MD to an attitude such that the image it displays is not a subset of or coextensive with the image the stationary display device SD displays. In this case, a ray normal to the plane of movable display MD does not intersect the assumed or actual location of stationary display SD. In the example shown, the stationary display device SD displays the pyramid, octahedron and prism (P2, P3, P4) but the cube (P1) is out of view. By moving the movable display device MD to a spatial attitude that interposes the movable display device as a virtual window between the person and the virtual cube, the person can "see" the cube on the movable display device. Because the person can see both displays SD, MD at the same time, movable display device MD enhances the spatiality of the immersive 3D virtual world by allowing the person to feel as if he is within and surrounded by the virtual world. The movable display device MD allows the person to discover aspects of the virtual world that stationary display device SD is not exposing to view. For example, the person can direct the movable display device MD downward to visualize the ground or other virtual surface the person is standing on (e.g., a green golf fairway, desert sand, the deck of a ship or spacecraft, or other virtual surface). See FIG. 7 for a golf example that shows the virtual golf ball and golf club head. Or the person could direct movable display MD upward to view the virtual ceiling, sky, stars, moon, or other virtual overhead space. The possibilities are limitless. In such cases, extended spatial cues can be displayed on the stationary display SD if desired to help the person perceptually correlate the images or action displayed on the movable display MD with the images or action displayed on the stationary display SD. The movable display MD in this instance acts as a spatial extension of the stationary display SD to make the system S multidimensionally spatial and spatially coherent and expand the user's field of view of the virtual space.

There could be more than one stationary display SD and more than one movable display MD. FIG. 8D shows an example with one stationary display SD and two movable displays MD1, MD2. One user can hold one movable display MD1, and another user can hold an additional movable display MD2. Both users can see the same stationary display SD. This application is useful for situations where two (or more) users wish to share and interact with the same virtual environment at the same time. The users do not need to be co-located. For example, system S could be distributed by network such as the Internet or other network, each user could have her own stationary display SD and movable display MD, and all of the displays could display portions of the same virtual environment.

In other example implementations, there may be no stationary screen. Imagine N mobile screens that start with an initial calibration step to correlate their physical spatial orientation. After this calibration step, the N screens represent a physically spatially coherent view of the virtual database. This can even be extended to position correlation if there is a good way to sense positions unambiguously in all conditions. With some example implementations, orientation is determined by using the magnetic sensor to correct orientational drift. However, it is possible to provide the same if a better positional sensor(s) exist to have perfect location info.

Example Applications that Context-Switch Movable Display Based on Attitude

Figure 6A:
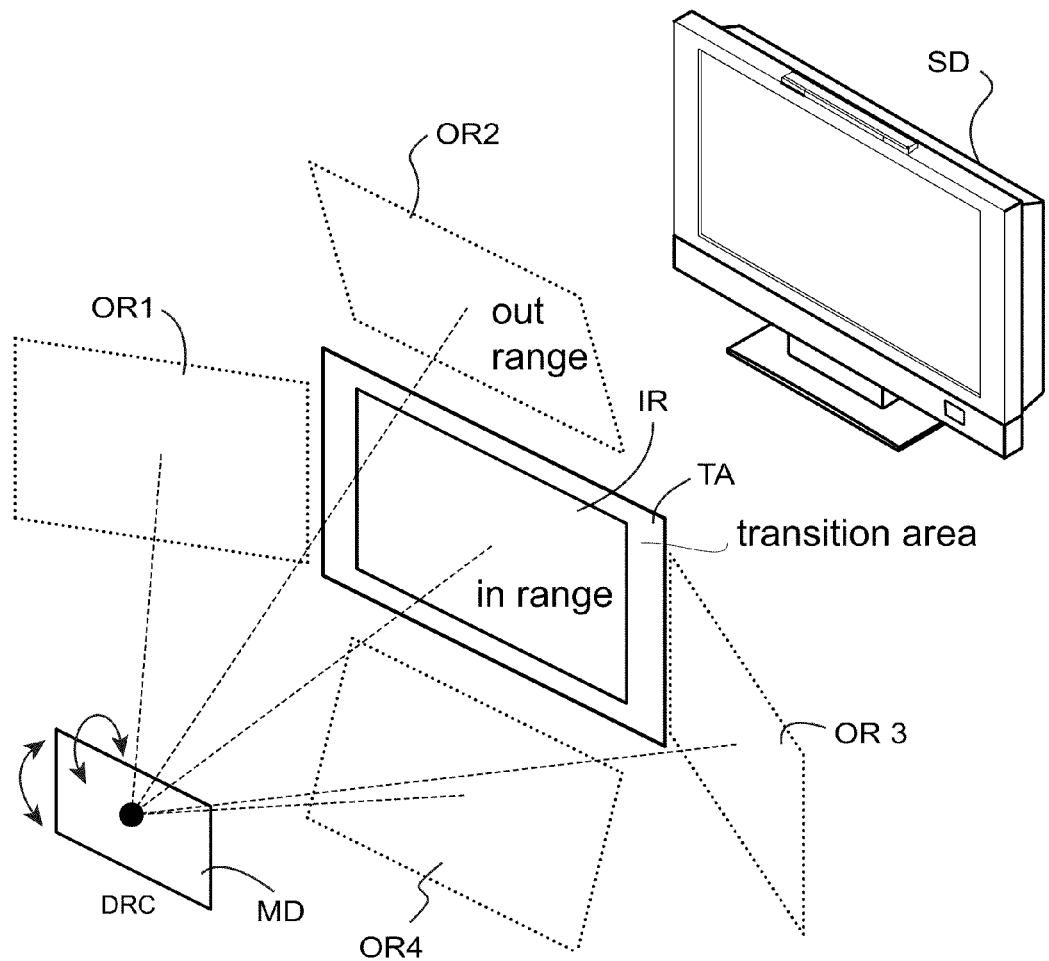
FIG. 6A shows various example attitudes of the movable display device relative to the stationary display device including in-range, out-of-range and transition area relative attitudes.

In some non-limiting applications, it may be desirable to use movable display MD for different purposes or contexts depending on the attitude and/or pointing direction of the movable display e.g., relative to the stationary display SD. FIG. 6A shows three different general types of relationships between the attitude of movable display MD and the stationary display SD:

(a) in range,
(b) out of range, and
(c) transition area.

FIG. 6A shows a number of out-of-range cases OR1-OR4 where the vector projecting from movable display MD that is normal to the plane of the movable display does not indicate or intersect a position within an area corresponding to an ideal or assumed stationary display SD. FIG. 6A also shows an in-range case IR where the normal vector projecting from movable display MD does indicate, intersect or point to a position within an area corresponding to an ideal or assumed stationary display. FIG. 6A also shows a transition area TA surrounding or at borders or peripheries of the in-range case IR in which the normal projecting from the movable display may indicate or intersect an edge or periphery of an area corresponding to an ideal or assumed stationary display.

In some example non-limiting implementations, system S can automatically switch usage or context of movable display MD depending on whether the movable display's attitude or pointing direction is in-range or out-of-range. In one example non-limiting implementation, the pointing direction of movable display MD may for example be defined by a ray normal to the plane of the movable display and extending outward from the back surface of the movable display away from the user. Such an example non-limiting pointing direction thus corresponds to the direction of the user's gaze if the user were able to look through movable display MD as if it were a pane of transparent glass.

In Range

Figure 6B:
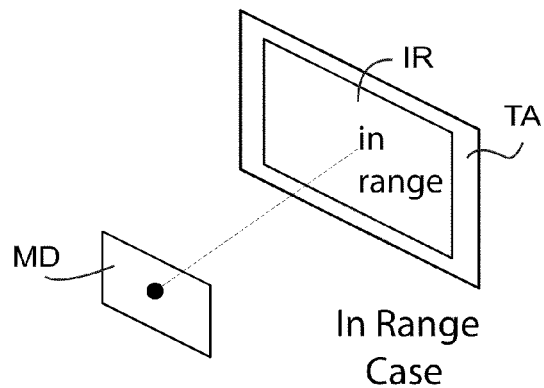
FIGS. 6B through 6D show example non-limiting applications and usage for an in-range case.

FIG. 6B shows an example in-range case where the normal of movable display MD indicates or intersects a position inside the area determined virtually according to the ideal attitude and extent of stationary display SD. In this particular example, the actual attitude and extent of the stationary display SD may not be precisely known by system S (for example, if the stationary display comprises a home television set, the user may be using any of a variety of different sizes and configurations of televisions), and so system S may make certain assumptions concerning the size of the stationary display, the distance between the movable display MD and the stationary display and the orientation of the stationary display SD relative to the movable display. These assumptions are possible because most users typically at least generally face toward the stationary display SD, usually position themselves more or less in front of the stationary display, and are unlikely to be situated very close or very far from the stationary display. Additional input by the user (e.g., size or type of television screen) or otherwise may be used to supplement these assumptions.

Figure 6C:
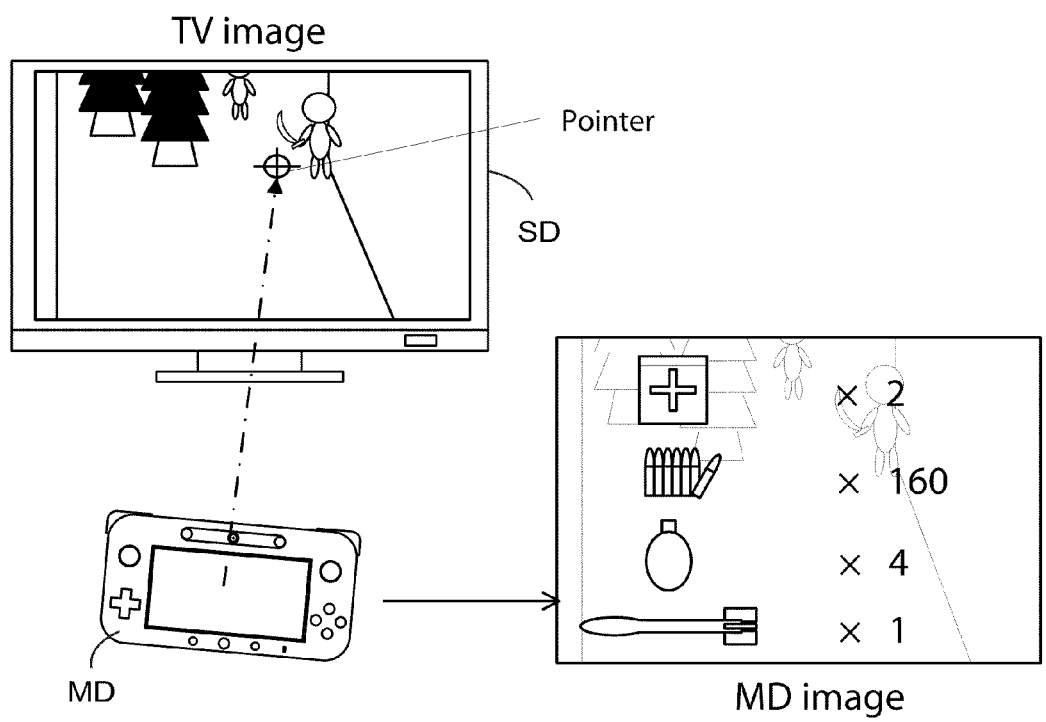

In such an in-range case for some non-limiting implementations, the position of a pointer such as cursor or other object displayed on the stationary display SD (as shown in FIG. 6C) may be controlled by the attitude of the movable display MD. Moving the movable display MD to a different attitude will in such a non-limiting embodiment cause the position of the pointer object displayed on stationary display SD to change (e.g., based on information from the sensors T), such that the movable display functions as a free space pointing device. Simultaneously with changing the attitude of movable display MD, a user may provide additional inputs (e.g., by touching a touch screen TS, depressing buttons, etc.) that may control aspects of images displayed by either or both displays MD, SD. Thus, in one implementation, movable display MD acts as a virtual pointer for stationary display SD when pointing at the stationary display, and displays spatially-correlated additional views of the virtual world responsive to aspects of the movable display's attitude when not pointing at the stationary display.

In such an example, a virtual camera defining the view for display by stationary display SD does not necessarily move or change according to the attitude of movable display MD. Users will mainly see the stationary display SD in many or most applications, so the virtual space the stationary display SD displays does not necessarily need to be displayed on the movable display MD. In such a non-limiting instance, the movable display MD can be used to display other types of information such as for example score (for a game), statistics, menu selections, user input options, or any of a variety of other ancillary or other information useful to the user. In some cases, the movable display may overlay such information to augment a displayed image of the virtual world from a direction based on the attitude of the movable display MD. Thus, in some implementations, the movable display MD can display more limited (or different, supplemental, control or non-redundant) information while the user's attention is likely to be focused on the stationary display SD.

Figure 6D:
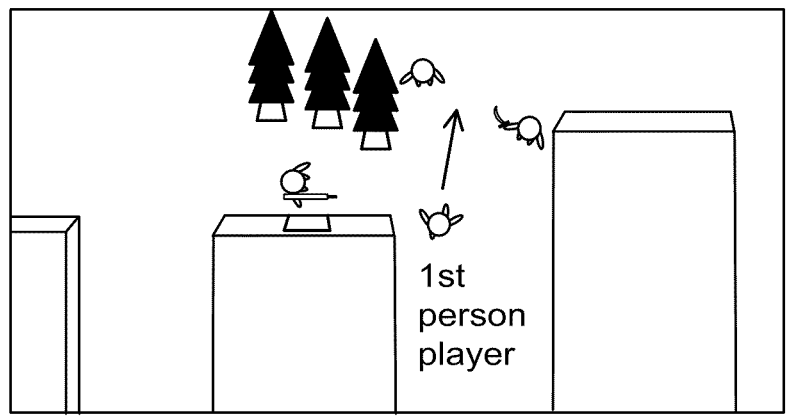

FIG. 6D show a bird's eye map or view of the virtual space displayed by stationary display SD. FIG. 6D shows with an arrow the direction of the virtual camera for defining the image the stationary display SD displays from a first person viewpoint of a virtual character within the virtual space. Moving the virtual character within the virtual space may change the view that stationary display SD displays. Of course, in other implementations, it would be possible to display the bird's eye or other view on movable display MD to permit the user to more easily navigate through the virtual space displayed by the stationary display SD.

Out-Of-Range

Figure 6E:
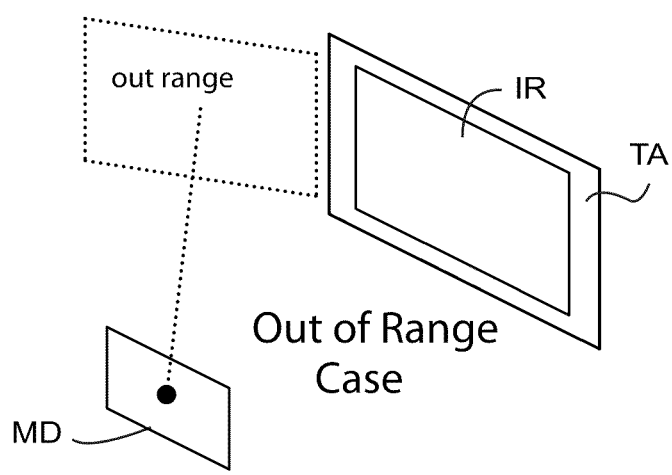
FIGS. 6E through 6H show example non-limiting applications and usage for an out-of-range case.
Figure 6F:
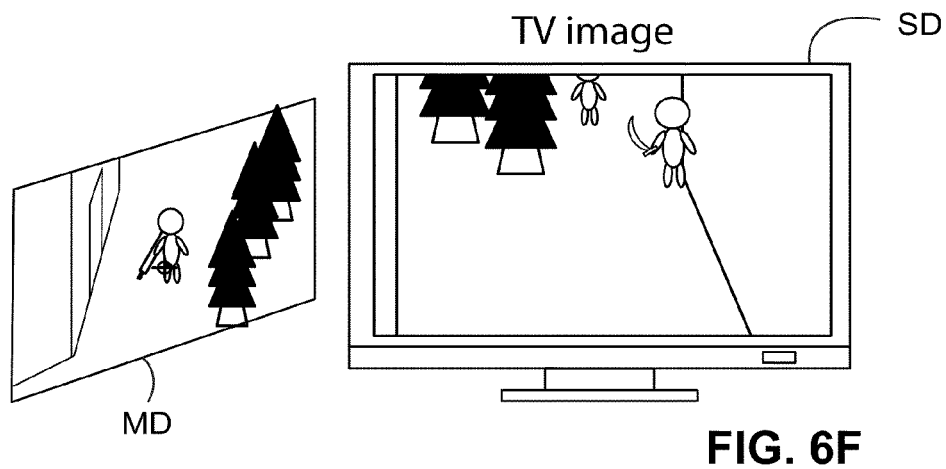

FIG. 6E shows an example non-limiting out-of-range case where the normal of movable display MD does not indicate, point to or intersect a position inside the area determined virtually according to the ideal attitude of stationary display SD. When the normal of the movable display MD indicates the position outside the stationary display SD area, system S may use the movable display MD to display the virtual space and the direction of the virtual camera for generating images displayed by movable display MD may be controlled by the movable display's attitude. See FIGS. 6 & 6F which show movable display MD displaying the virtual space from a direction that depends on the movable display's attitude. Meanwhile, in such a non-limiting case, the direction of a virtual camera for creating images to be displayed by the stationary display SD is not necessarily affected by the attitude of the movable display MD. Users can see right, left upper, under and rear side of the virtual space by moving the movable display MD, and can see the front side of the virtual space by viewing the stationary display SD. In this non-limiting application, users can feel that their visibility has been spatially expanded by being able to simultaneously view side and front views of the virtual space.

Figure 6G:
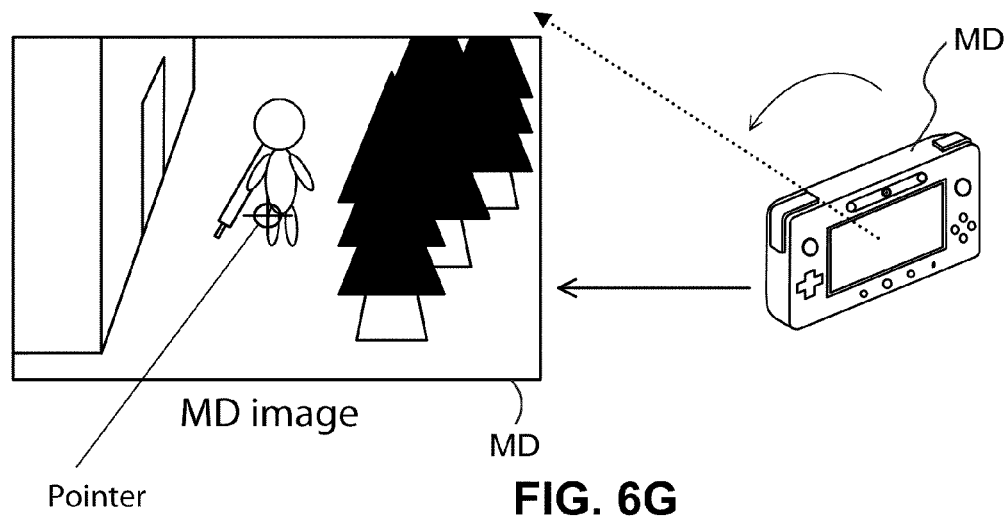
Figure 6H:
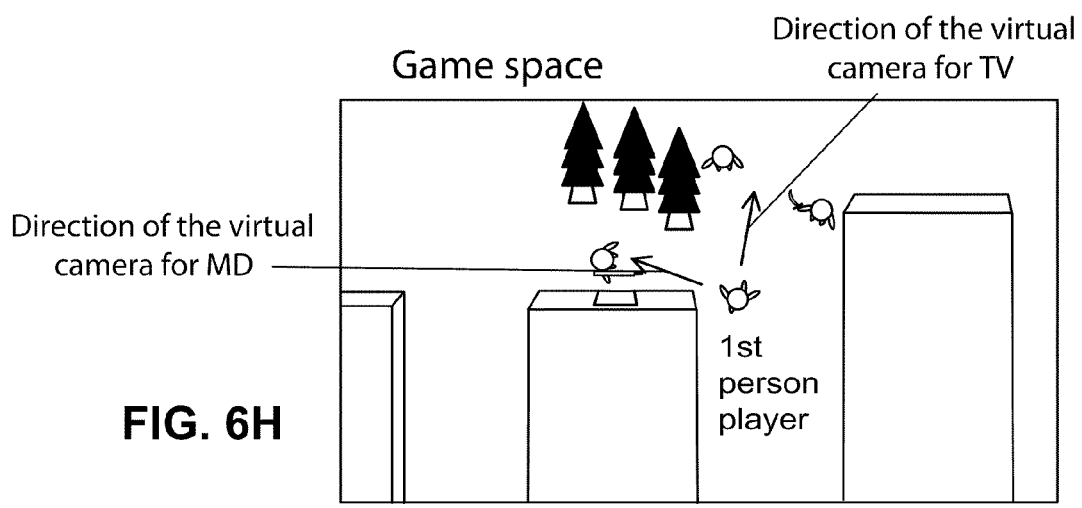

In some non-limiting implementations, the pointing position of a pointer, cursor or other object displayed on the movable display MD can also be controlled, for example, to stay in the center of the movable display device's display screen as the image beneath it changes in viewing direction to reflect the attitude of the movable display. See FIG. 6G. FIG. 6H shows a bird's eye view of an example virtual space showing the direction of the virtual camera for the movable display MD showing two viewing directions, one for the stationary display and another for the movable display. Simultaneously displaying an image of the virtual space on the stationary display SD and an additional image from a different viewing direction of the virtual space on the movable display MD provides a perception of depth and spatial immersiveness for the user. See also FIG. 12A.

Transition Area Case

Figure 6I:
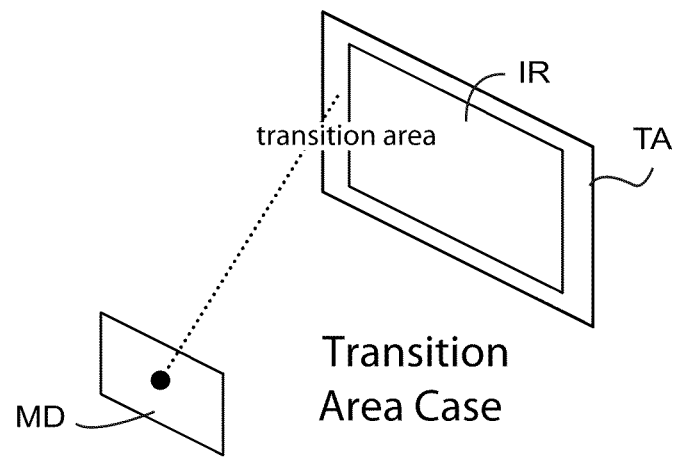
FIGS. 6I through 6J show example non-limiting applications and usage for a transition area case.
Figure 6J:
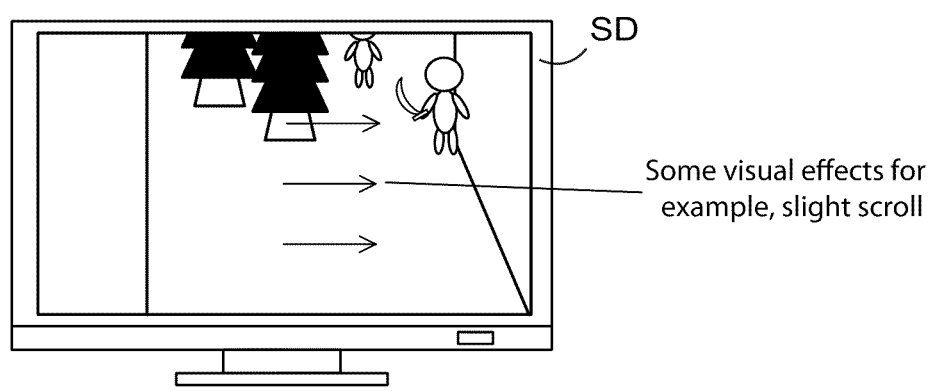
Figure 7:
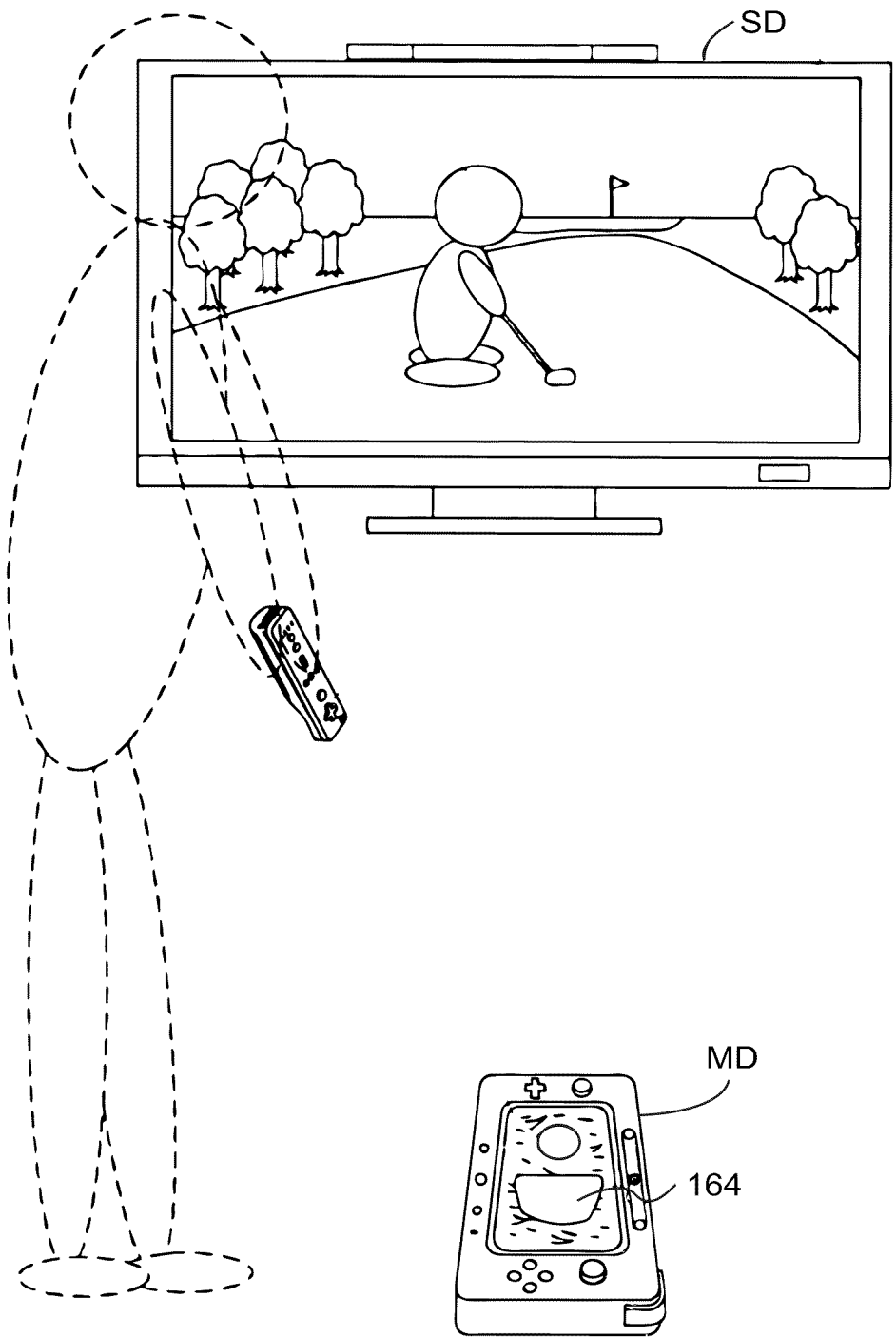
FIG. 7 shows an example non-limiting application of the movable display device.

FIGS. 6I and 6J show a transition area case that exists between the in-range and out-of-range cases described above. FIG. 6I shows that some transition area TA can be configured between in-range and out-of-range (inside and outside) so that users can change their gaze (the direction of their eyes) from the stationary display SD to the movable display MD smoothly by some processing. For example, when the attitude of movable display MD corresponds to the transition area, the image for the stationary display SD may provide some visual, audible and/or tactile effect (e.g., the stationary display SD may scroll slightly) so that users can know when the image of the movable display MD changes from the in-range condition to the out-of-range condition or vice-versa. In one example implementation, a slight scrolling or other movement of the stationary display SD responsive to the relative attitudes of the movable and stationary displays MD, SD can be used to alert the user that a context change will occur if the user continues to rotate or otherwise change the attitude of the movable display MD. The same or different image or other effects can be used indicate transition from in-range to out-of-range and out-of-range to in-range.

Thus, if the user is aiming at the big screen of stationary display SD using the movable device MD, he is likely always watching the big screen and controlling the target. If the user targets near the edge area, the transition mode may exist. The big screen slightly or marginally shifts toward the direction of the gun direction. But after some marginal movement, suddenly the smaller screen of movable display MD starts displaying portions of the virtual space outside the stationary display SD. This can be a dramatic effect. At the transition, a slight lookabout for a small degree is possible to move the image displayed by the stationary display SD. Such a marginal or peripheral lookabout shift (e.g., based on the presence of a cursor or other pointer object controlled in accordance with aspects of the attitude of the movable display) can be provided in the direction of and in response to movement of movable display MD, e.g. to alert the user that a context switch of the movable display is about to occur either from a lookaround display mode to an auxiliary information display mode or vice versa.

Figure 8A:
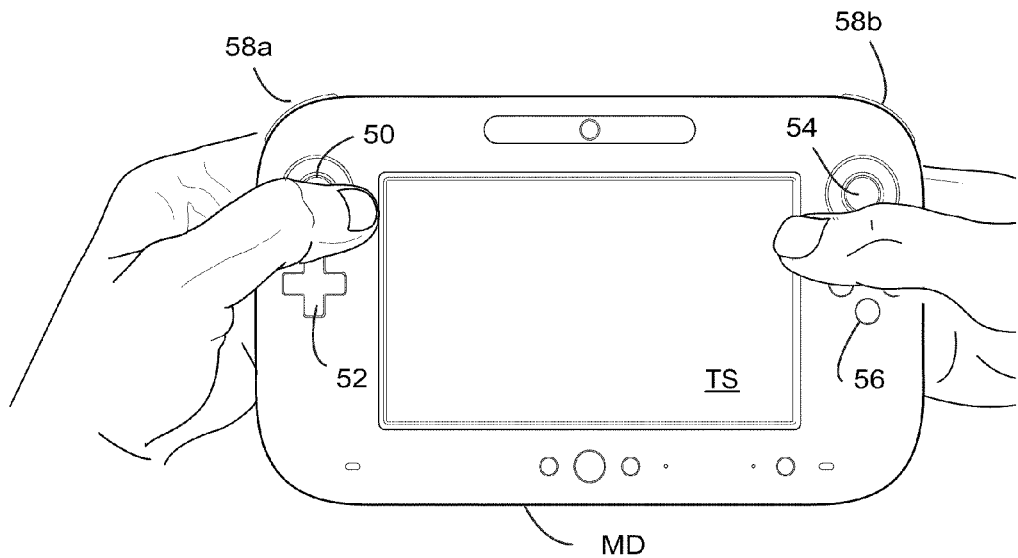
FIG. 8A shows how a human can hold the movable display device in two hands.
Figure 10A:
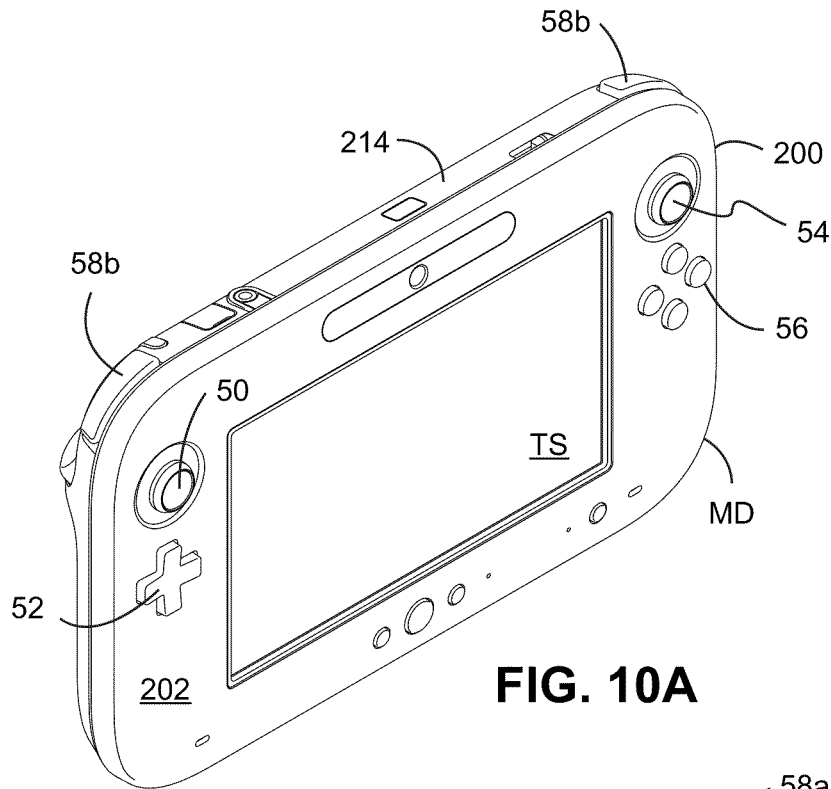
FIGS. 10A-10D show more detailed views of an example non-limiting movable display device.
Figure 10B:
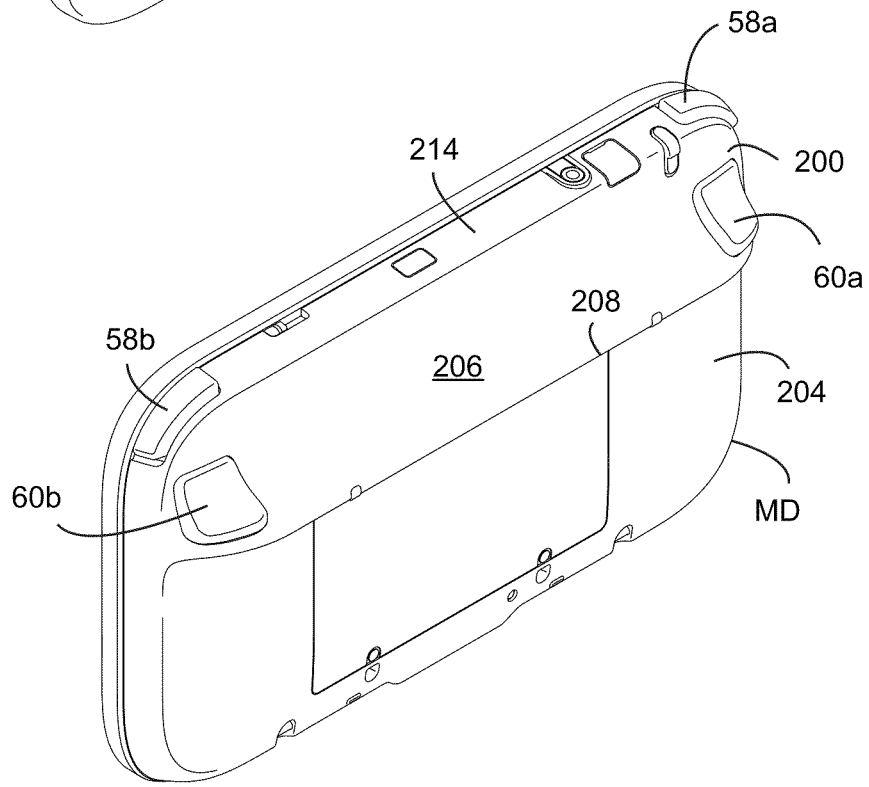
Figure 10C:
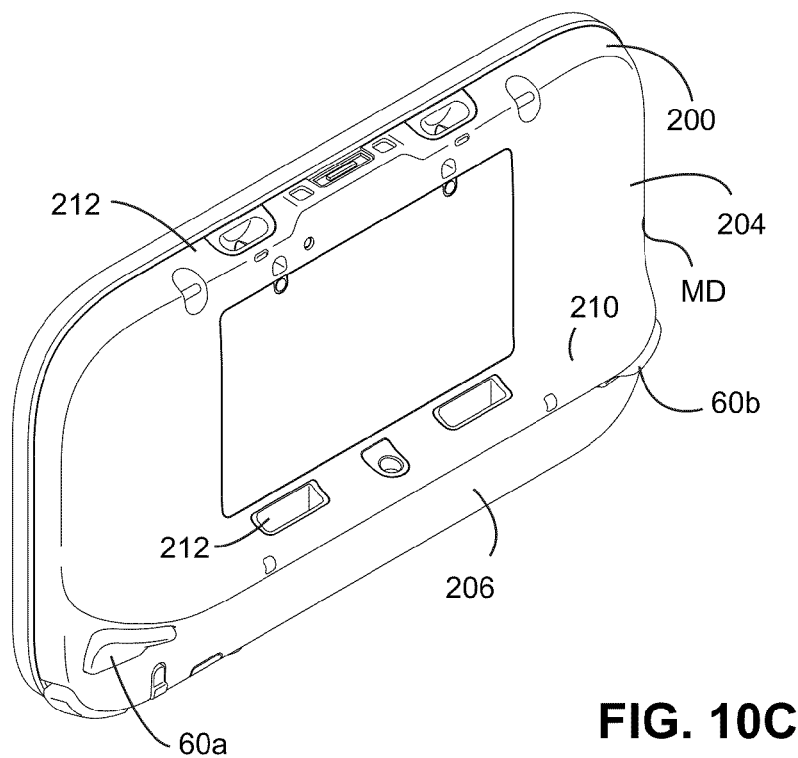
Figure 10D:
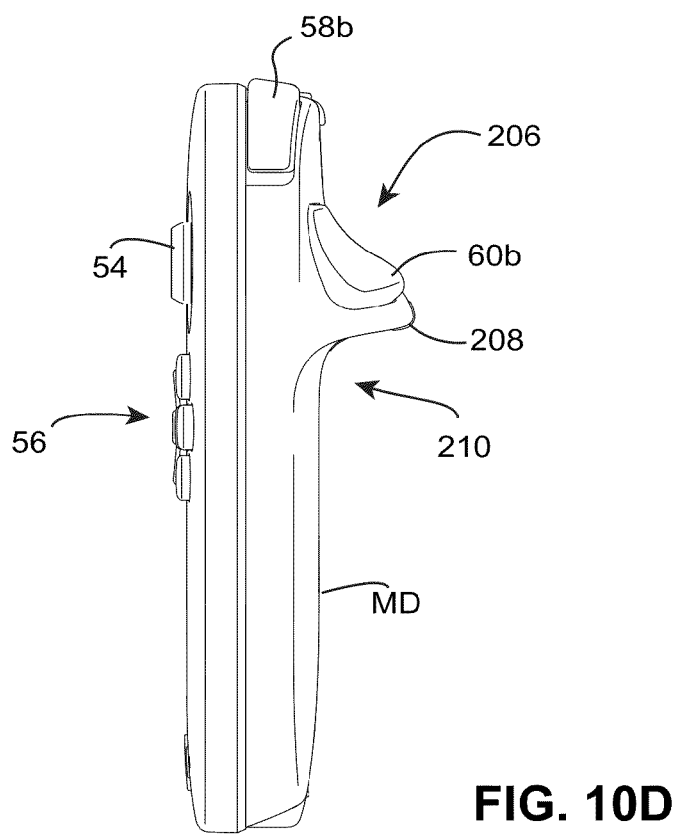

More Detailed Non-Limiting Examples:

As shown in FIG. 8A, display device MD is structured and configured to be easily holdable and movable by a person. For example, display device MD may be relatively small, portable and lightweight so it can be held in, gripped and supported by, manipulated by and movable by the person's hand(s). In the particular example shown in FIG. 8A, display device MD is configured and structured to be held in the person's left and right hands simultaneously. With the person's two hands holding and supporting the movable display device MD, the thumb of the person's left hand can operate some manual input controls (e.g., a left-hand slide pad 50 and/or a D-pad switch 52) while the thumb of the person's right hand can simultaneously operate other manual input controls (e.g., a right-hand slide pad 54 and/or a button array 56). There are additional controls 58a, 58b that can be operated by the person's pointer fingers, and more controls such as triggers 60 on the rear surface (see FIG. 10B, 10D) that can be operated by the person's middle finger for example while the person is holding display device MD. More detail concerning the detailed electromechanical structure and operation of movable display device MD (and see also FIGS. 10A-10D showing an example non-limiting ergonomic handheld design) may be found in U.S. patent applications Ser. Nos. 13/019,924 and 13/019,928 filed on Feb. 2, 2011, the contents of which are incorporated herein by reference in their entirety. In the Figures of 10A-10C, the movable or handheld device MD housing 200 includes a front planar surface 202 and a rear substantially non-planar surface 204. As can be seen in FIGS. 10B, 10C, the rear non-planar surface 204 includes a sloping curved portion 206 that slopes up to a longitudinal ridge 206. A depression 210 on the other side of ridge 206 may provide various receptacles 212 for accepting accessories such as legs for a stand (see FIG. 8C) or other peripheral devices. Finger-depressible buttons 60a, 60b provided on sloping curved portion 206 (see FIG. 10D) are curved to have a profile that matches the profile of the sloped curved portion while extending outward to provide comfortable resting pads for the user's middle digits. Thus, the user can operate the buttons 60 with middle fingers and operate trigger buttons 58 with pointer fingers. Other devices, sensors, connectors, receiving receptacles and other structures (some of which may be useful for mating the movable display MD with other devices) may be disposed on peripheral surfaces 212, 214. The implementation is not limited to this form factor; other form factors (e.g., tablet computer, IPAD, smart phone, ebook reader, PDA, other) are possible for movable handheld display device MD.

In some example implementations, display device MD could be worn by a person, for example attached to a part of the person's body such as the person's wrist, forearm, upper arm, leg, foot, waist, head, or any other portion of the person's body or clothing. In other example implementations, movable handholdable display device MD can be fixedly or otherwise mounted to a movable or fixed inanimate structure (see e.g., 7, 8C). For example, in some example arrangements, as shown in FIG. 8C, display device MD can be temporarily fixed to or stood on a non-movable structure (e.g., using an integral pull-out or other stand that maintains an easily viewable attitude of display device MD relative to another structure such as a tabletop, a floor, a frame, etc.). In other example arrangements, even though display device MD may be temporarily fixed in attitude relative to another structure, a person can reorient it as desired or pick it up and move it around.

Figure 8B:
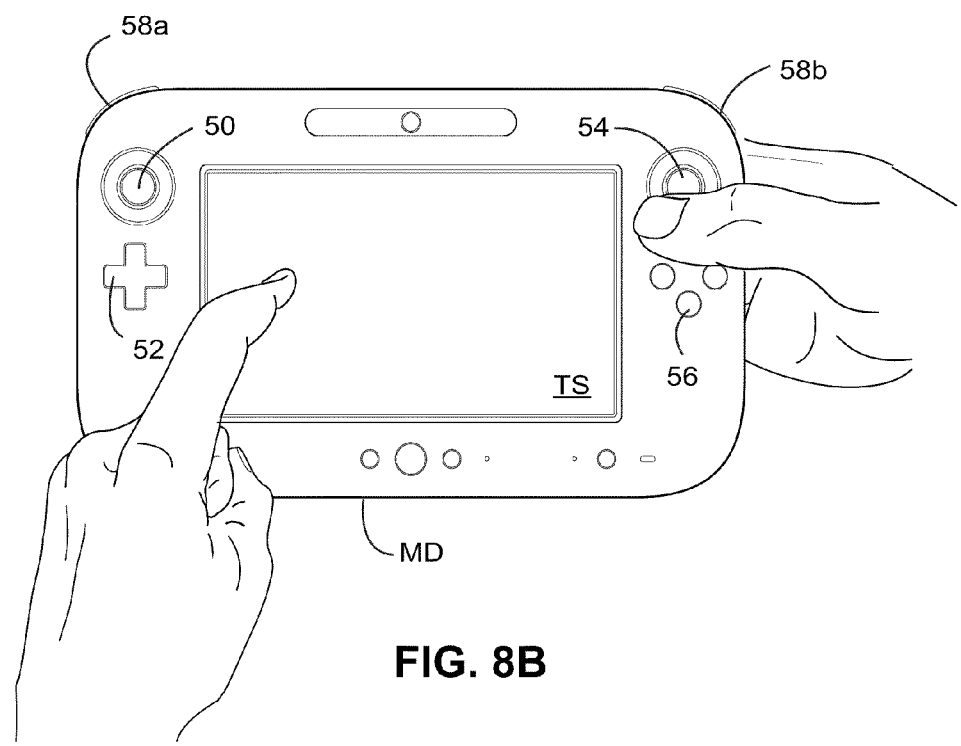
FIG. 8B shows how a human can hold the movable display device in one hand and use the pointing finger of the other hand to point to the touch screen.
Figure 8C:
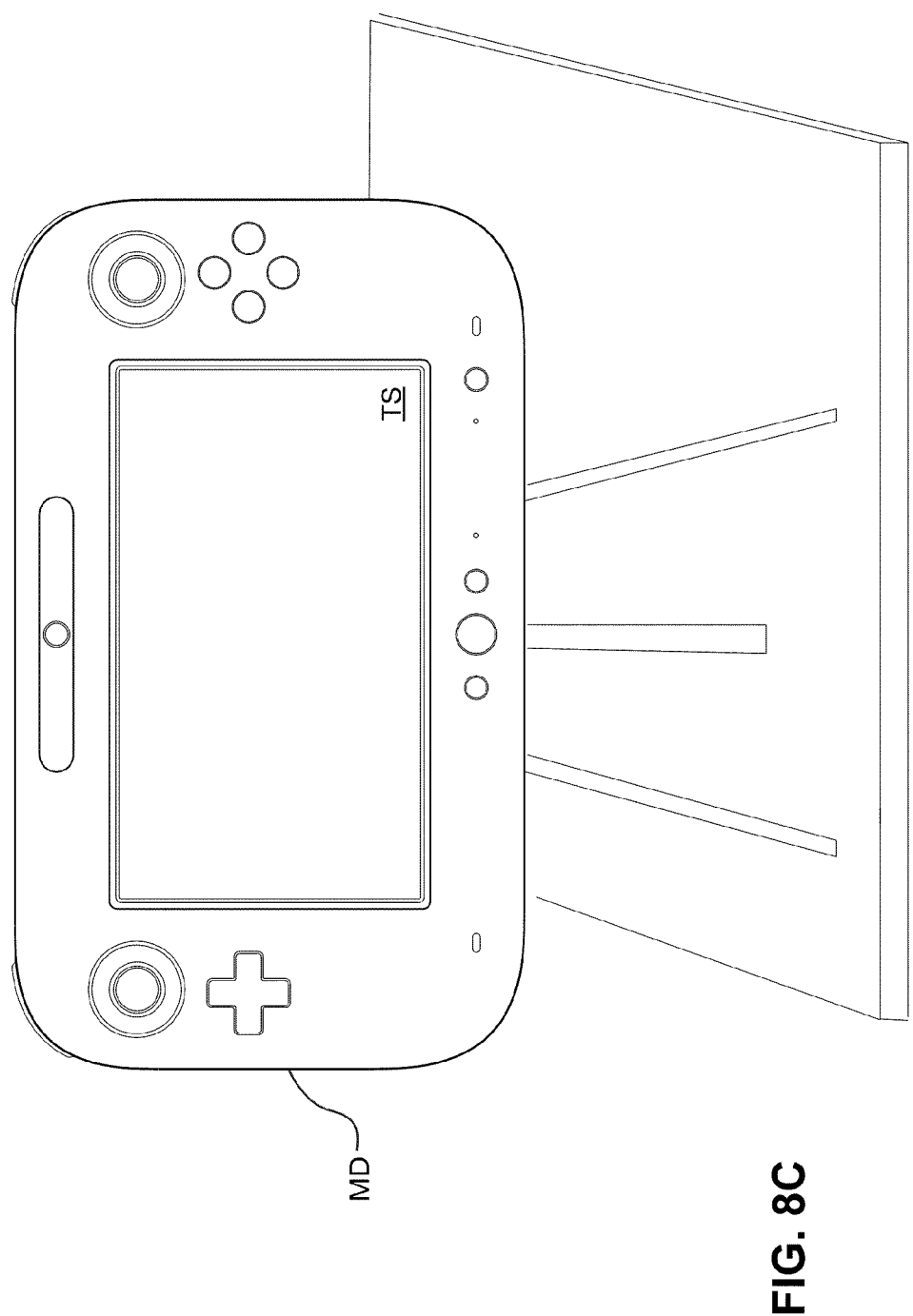
FIG. 8C shows how the movable display device can be rested on a surface.
Figure 8D:
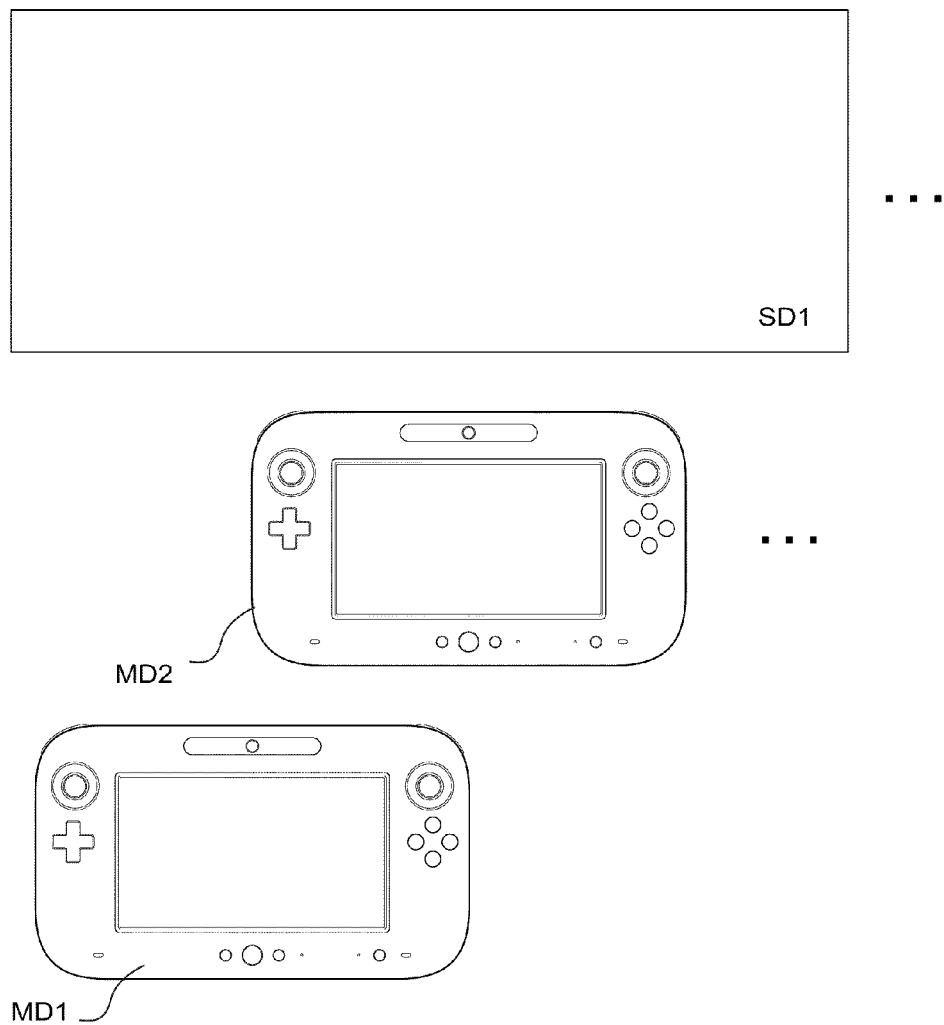
FIG. 8D shows how plural movable display devices can be used with together with a common stationary display.
Figure 8E:
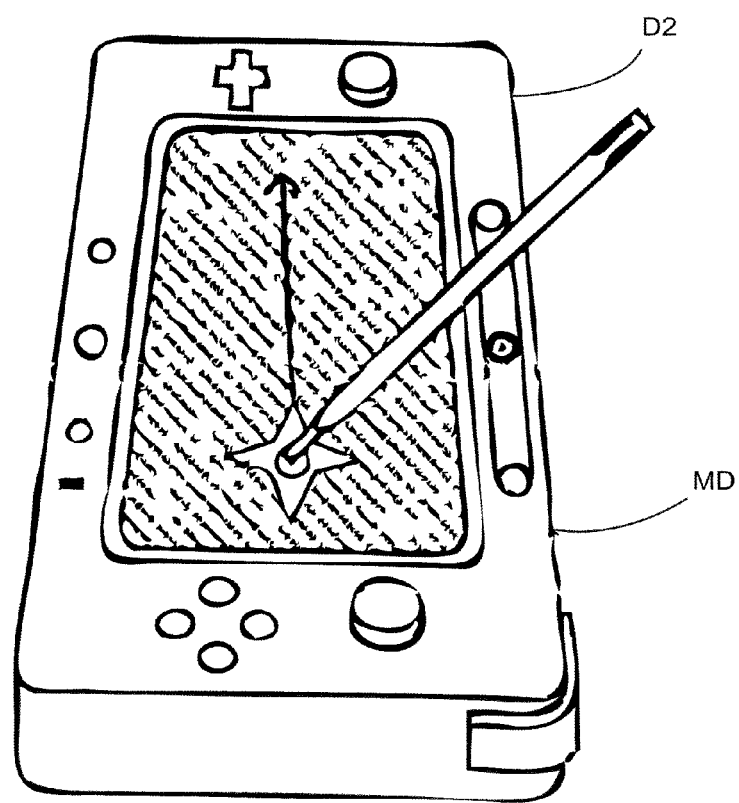
FIG. 8E shows how a movable display device can be rested on a surface or held and how a stylus can be used to point to and manipulate images displayed on the touch screen.

As mentioned above, non-limiting display device MD has a touch screen TS that can be controlled by touching it with a stylus (see FIG. 8E) or a finger (see FIG. 8B). The touch screen can be used to provide various inputs including handwriting, gestures, etc.

Sensors T determine the attitude of display device MD. Sensors T may be contained within display device MD, placed outside of display device MD, or some sensors may be disposed within display device MD and other sensors may be disposed externally to display device MD. More detail concerning example non-limiting arrangements for sensors T may be found in U.S. patent applications Ser. Nos. 13/019,924 and 13/019,928, filed on Feb. 2, 2011, the contents of which are incorporated herein by reference in their entirety. Special solutions or applications may use G (gravity) only, M (magnetic) only, or MG (magnetic+gyro) only out of "MARG" for 2D, leaner or reduced movement or special games or other applications.

Figure 9A:
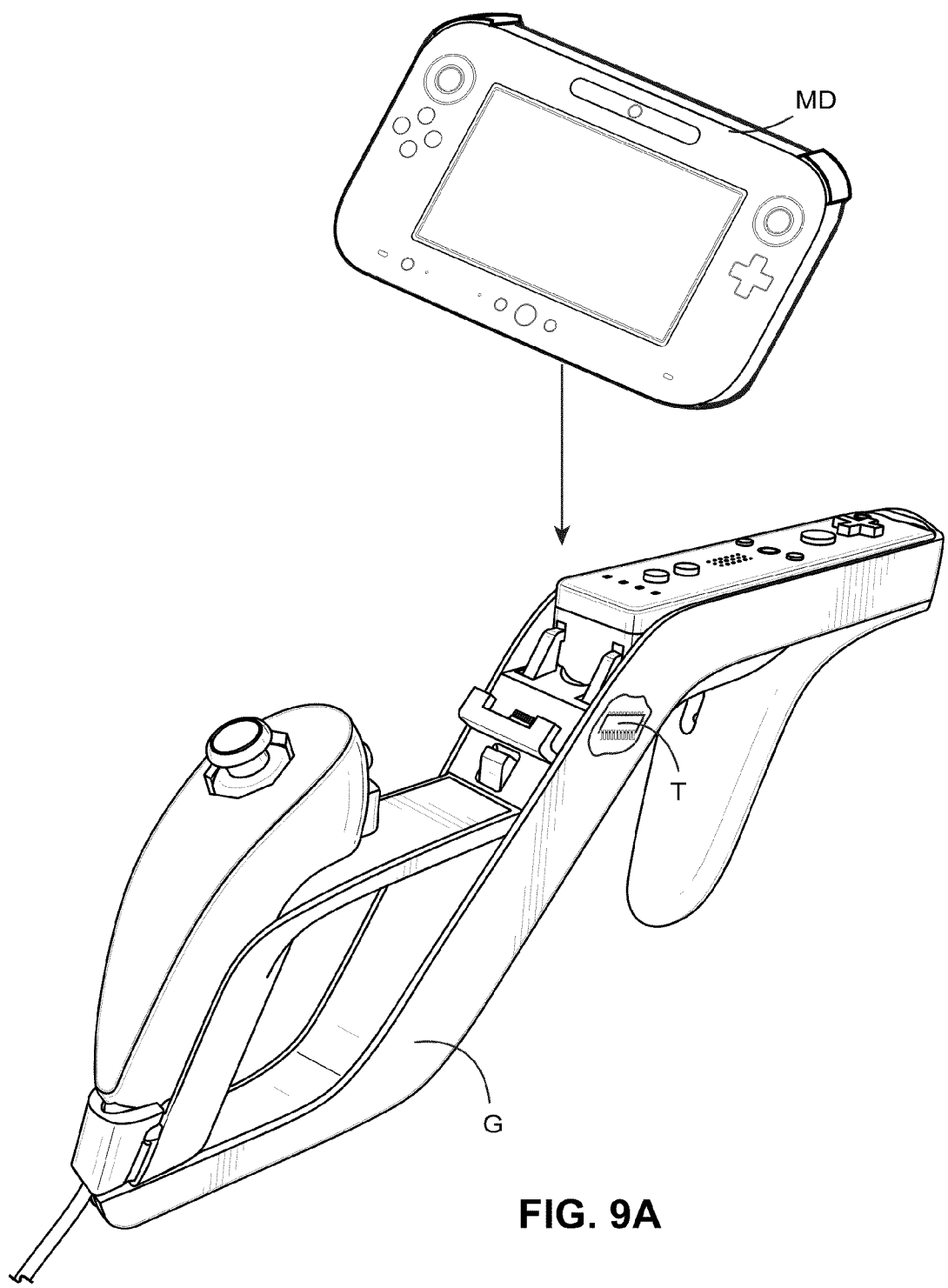
FIGS. 9A and 9B show example attachment of the moveable display device to an example gun type accessory.
Figure 9B:
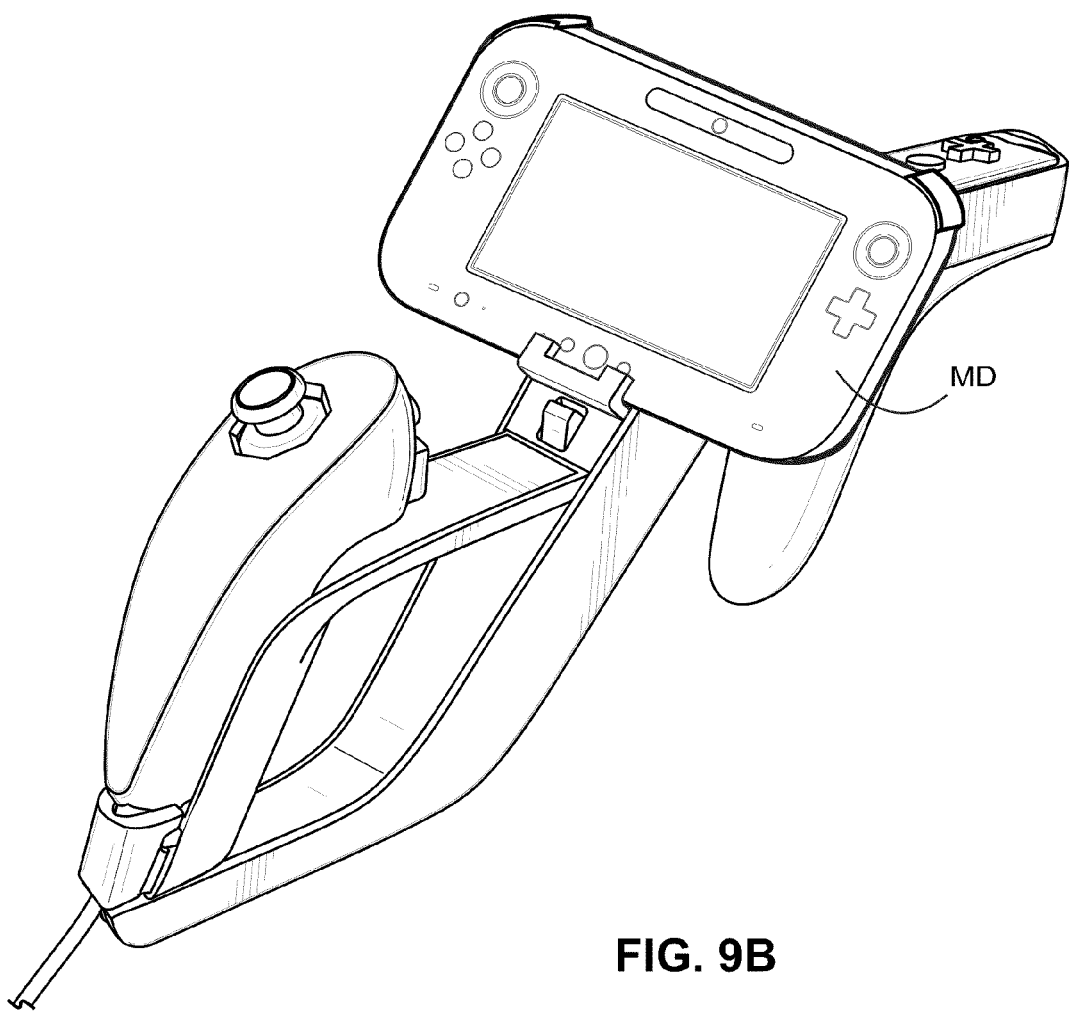

In one particular example, sensors T may comprise a "MARG" sensor array spread between display device MD and a movable accessory device to which the movable display MD can be fixedly attached (see FIG. 9A, 9B). For example, the magnetometer of MARG can be disposed within the accessory device, and the accelerometer and gyrosensors of MARG can be disposed within the movable handheld display device MD housing. When the movable display device MD and the accessory device are mated, electrically connections can be established that allows the magnetometer within the accessory device to receive power from the movable handholdable display device MD and for the movable display device to receive data from the magnetometer. Other variations are possible.

In other implementations, sensors T shown in FIG. 1 may include any desired sensor(s) such as mechanical, acoustic, ultrasonic, camera, optical, infrared, magnetic, electromagnetic (e.g., radio or microwave), inertial, gyroscopic, acceleration-based, fiducial-based, outside-looking-in, inside-looking-out, GPS, cell phone, and/or any combination thereof.

As mentioned above, in some example non-limiting implementations, sensors T representing a collection of sensors which makes up MARG may be distributed in one or more housings or places. Such housings can be for example either stationary or moved spatially by the user. The subset of housing elements can be combined together to behave as a single element as shown in FIGS. 9A, 9B.

In one example, sensors T may include some or all of the sensors used in the Nintendo Wii Remote Controller and/or Nintendo Wii Remote Plus video game controller, i.e., a direct pointing device, a triaxial or other accelerometer, and/or a triaxial or other gyroscope. Such sensors T could also include a multi-axis single-chip magnetometer, an inside-looking-out or outside-looking-in external optical, ultrasonic and/or other tracker, or many other variations as would be understood by those skilled in the art. Although not necessary for many applications such as home virtual reality and video game play, it might be desirable in certain applications to accurately track the complete pose (position and orientation) of the movable display MD with a desired degree of accuracy to provide nearly complete fidelity in spatial correlation between the image displayed by the movable display MD and the image the stationary display SD displays. The items listed below and incorporated by reference enable one skilled in the art to implement any desired arrangement of sensors T based on particular system requirements and desired applications:

X. Yun et al, "Design and Implementation of the MARG Human Body Motion Tracking System," Proceedings of the IEEE/RSJ International Conference on Intelligent Robots and Systems (IROS 04), Sendai, Japan, September-October 2004;

E. R. Bachmann et al, "Inertial and Magnetic Posture Tracking for Inserting Humans into Networked Virtual Environments," ACM Symposium on Virtual Reality Software and Technology, VRST 01, Banff, Alberta, Canada, November 2001, pp. 9-16;

Bachmann, "Orientation Tracking for Humans and Robots Using Inertial Sensors", Computational Intelligence in Robotics and Automation Proceedings (IEEE 1999) (this reference discloses orientation and position tracking for human movement);

Eric Bachmann, "Inertial and Magnetic Angle Tracking of Human Limb Segments for Inserting Humans into Synthetic Environments," PhD in Computer Science, Naval Postgraduate School, December 2000;

Welch et al, "Motion Tracking: No Silver Bullet, but a Respectable Arsenal", IEEE CG&A (November/December 2002)

Wormell et al, "Advancements in 3D Interactive Devices for Virtual Environments" (2003);

U.S. patent application Ser. Nos. 13/019,924 and 13/019,928, filed on Feb. 2, 2011;

U.S. Pat. No. 7,942,745;

U.S. Pat. No. 7,931,535;

U.S. Pat. No. 7,927,216;

U.S. Pat. No. 7,925,467;

U.S. Pat. No. 7,924,264; and

U.S. Pat. No. 7,920,985.

The items listed above are incorporated by reference for purposes of enabling and disclosing a variety of alternative ways to determine attitude and other characteristics of movable display MD in multi-dimensional space.

Example Block Diagram

Figure 11:
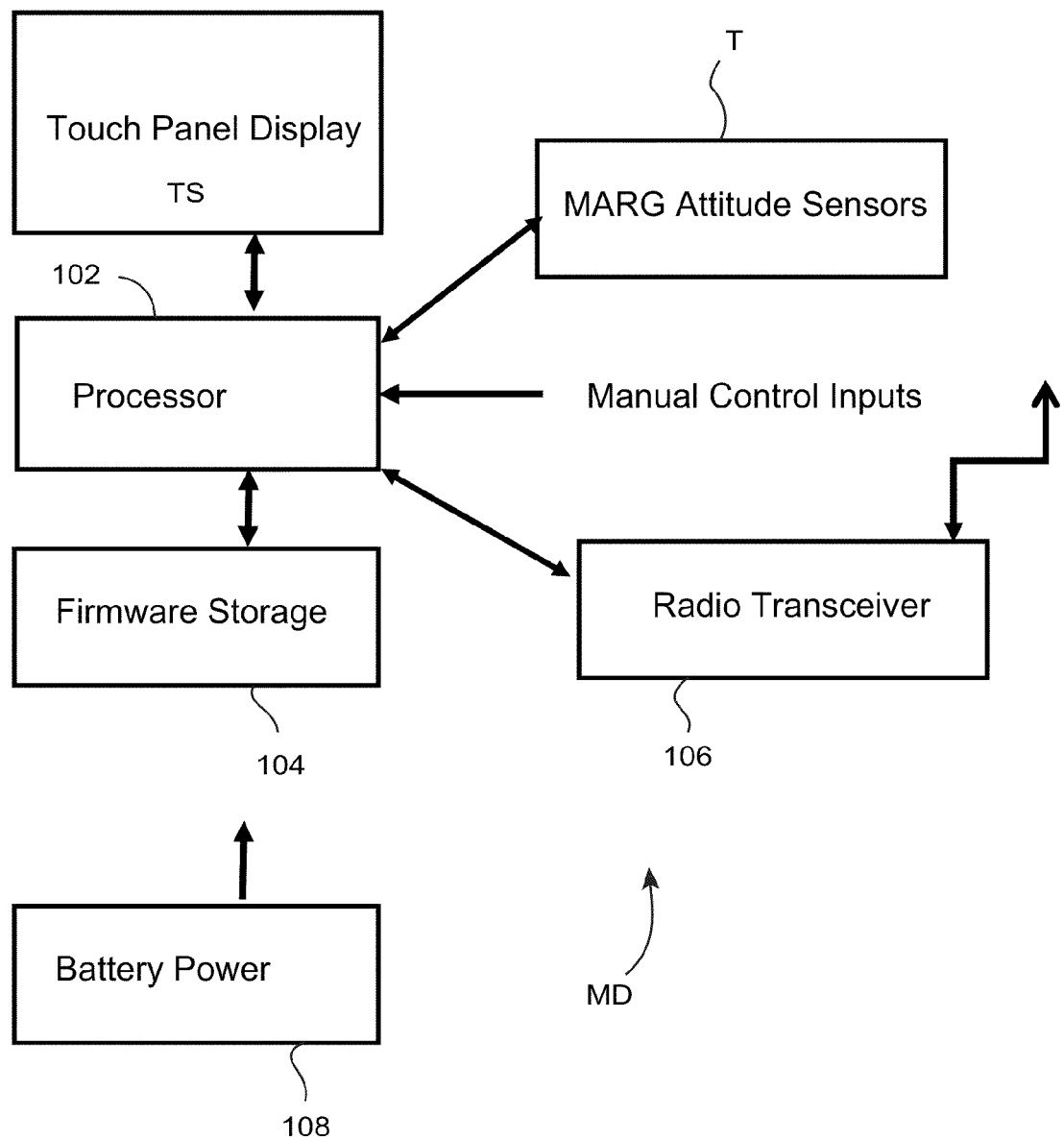
FIG. 11 shows an example non-limiting block diagram of a movable display device.

FIG. 11 shows an example non-limiting block diagram of movable display MD (for more details see U.S. patent application Ser. Nos. 13/019,924 and 13/019,928 filed on Feb. 2, 2011, the contents of which are incorporated herein by reference in their entirety). Manual control inputs from the manual controls detailed above are supplied to processor 102. The processor may harvest data inputs (including from touch panel display TS) and report them via a radio transceiver 106 or other wireless or wired connection to a remote console or computer G for analysis. The remote console or computer G (which may also be connected to stationary display SD wirelessly or by wire) may process the reported data inputs and generate compressed or other images that it may send to the movable display radio transceiver 106. The movable display device processor 102 may decompress the received images and display them on touch panel display TS.

The remote console or computer G can be one or more graphics generators located in one place or distributed in a variety of places communicating via one or more networks. Such graphics generator(s) can use conventional 3D graphics transformations, virtual camera and other techniques to provide appropriately spatially-coherent or other images for display by the displays MD, SD. For example, the graphics generator G can be any of:

a graphics generator that is part of or is a separate component co-located with stationary display SD and communicates remotely (e.g., wirelessly) with the movable display MD; or a graphics generator that is part of or is a separate component co-located with movable display MD and communicates remotely (e.g., wirelessly) with the stationary display SD or associated equipment; or a distributed graphics generating arrangement some of which is contained within the movable display MD housing and some of which is co-located with the stationary display SD, the distributed portions communicating together via a connection such as a wireless or wired network; or a graphics generator located remotely (e.g., in the cloud) from both the stationary and movable displays SD, MD and communicating with each of them via one or more network connections; or any combination or variation of the above.

In the case of a distributed graphics generator architecture or arrangement, appropriate data exchange and transmission protocols are used to provide low latency and maintain interactivity, as will be understood by those skilled in the art.

In one particular example, the MARG attitude sensors (i.e., a triaxial accelerometer, a triaxial gyroscope and a tri-axial magnetometer) provide sensor outputs to a processor 102 that executes instructions stored in non-transitory firmware storage 104. An example non-limiting method uses the 3-axis gyroscope (Angular Rate) with error correction by using 3-axis accelerometer based Gravity vector reference (for roll and pitch), and 3-axis Magnetometer based north vector reference (for yaw). This so called orientation or attitude measurement is by "Magnetic Angular Rate Gravity (MARG)". In the example shown, the MARG sensors T are not capable of detecting absolute position and use a magnetometer to detect what can be thought of as something like magnetic compass heading relative to the earth's magnetic field.

It is not necessary in many applications for system S to track the absolute or even relative position of movable display MD in 3D space because the user's depth perception does not in at least some such applications require such fidelity. For example, the human eye includes a lens that changes shape to focus on near and far objects, and the user uses monocular and binocular cues to perceive distance. See e.g., Schwartz et al, "Visual Perception, Fourth Edition: A Clinical Orientation" Chapter 10 (McGraw Hill 2004). In many applications, movable display MD will fill a large part of the user's near vision, and stationary display SD will be in only a portion of the user's far vision. Thus, in many applications, the user's eye may focus on one of the two displays at a time. The user may first look at one display and then at the other even though both displays are both in the user's field of vision. This may mean that in many useful applications, the fidelity of the positional spatial correlation and coherence does not need to be precise in order to create the desired immersive user interface effect, and maintaining precise positional or distance spatial correlation between the two displays may be unnecessary. In other applications, other arrangements may be desired.

Additionally, using practical consumer grade components, there may be instances where system S is unable to keep up with rapid movement of movable display MD. Luckily, during such rapid movement the person holding the movable display MD will also generally not be able to see the image it's displaying. Thus, it may be generally sufficient in many applications for system S to maintain spatial correlation for movable display MD for relatively static or slow-moving situations when the user can see the image the movable display MD displays.

An initial calibration step can be used to allow system S to establish and maintain attitudinal spatial coherence between the two displays SD, MD. In such case, the person may be asked to orient the movable display MD in a certain way relative to the stationary display SD to calibrate the system so that the magnetic compass bearing (e.g., NNW or 337.5°) of stationary display SD within the room or other environment is known. Calibration of movable display MD is possible in a general free space (3D) orientation, or transformation (movement) case (note that some special usage like 2D or linear orientation or movement as the subset of free space usage would also be possible). There, the example non-limiting implementation relies on the relative movement of the movable display MD with initial calibration.

To calibrate during setup, the person may hold the screen of movable display MD parallel to the stationary display SD while generally aiming a perpendicular vector at the center of the stationary display. A button or other user control may be pushed. The system S will measure and store the magnetic field in the room to determine the orientation that the movable display MD is in when the user says it is pointing at the stationary display SD. This calibration assumes (1) the magnetic field of the room doesn't change, (2) the stationary display SD isn't moved, and (3) the movable display MD is set up with this stationary display SD in this room. If the magnetic field is changed or the stationary display SD is moved or the system S is set up in another location, recalibration may be desirable. For example, recalibration may be performed when the room furniture or a metal panel in the room moves, or the battery is replaced (metal difference of alkaline batteries), or the environment changes the magnetic field in the room. In some residential areas located near street cars or light rails, dynamically changing magnetic fields may exist. It is possible to filter unexpected dynamic disturbance of the earth magnetic field by the initial magnitude of magnetic readouts, or unexpected values against gyroscope correspondence.

Figure 12:
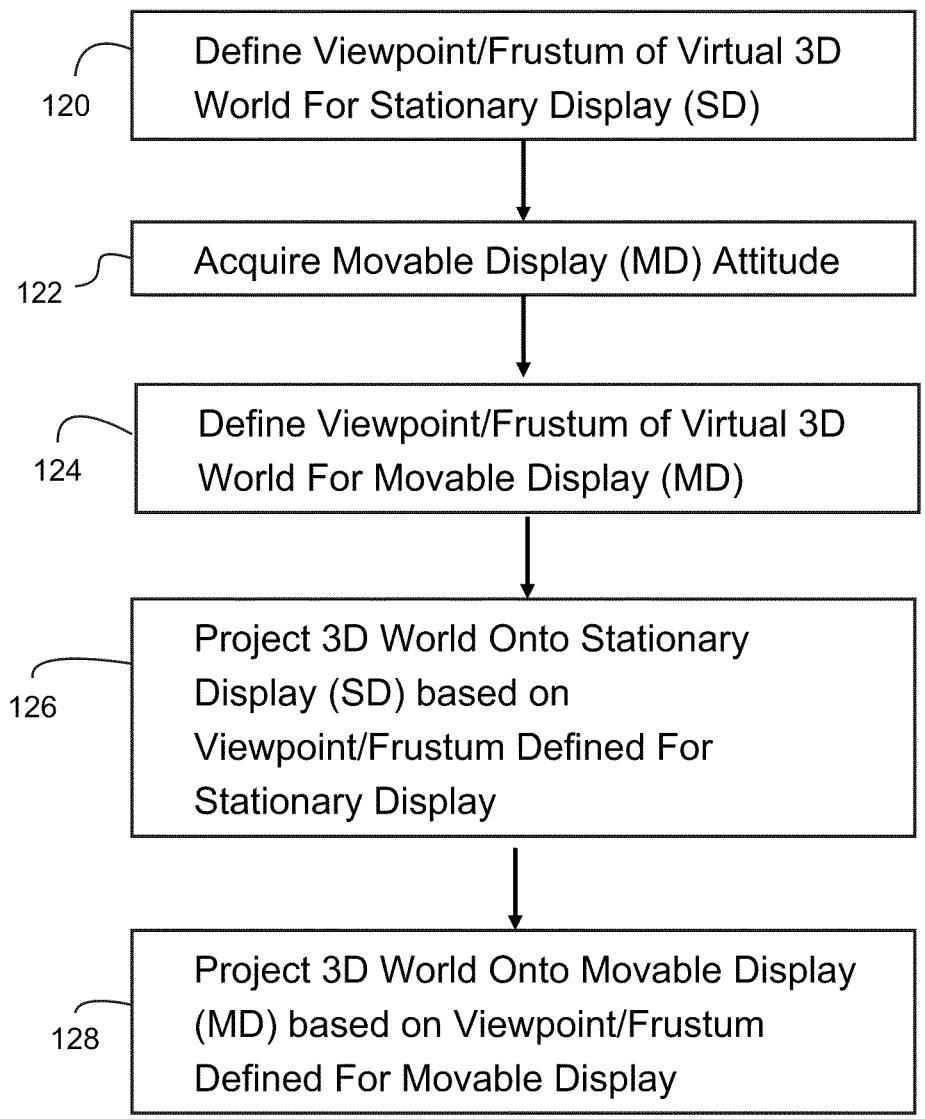
FIG. 12 shows an example non-limiting processing flowchart.
Figure 12A:
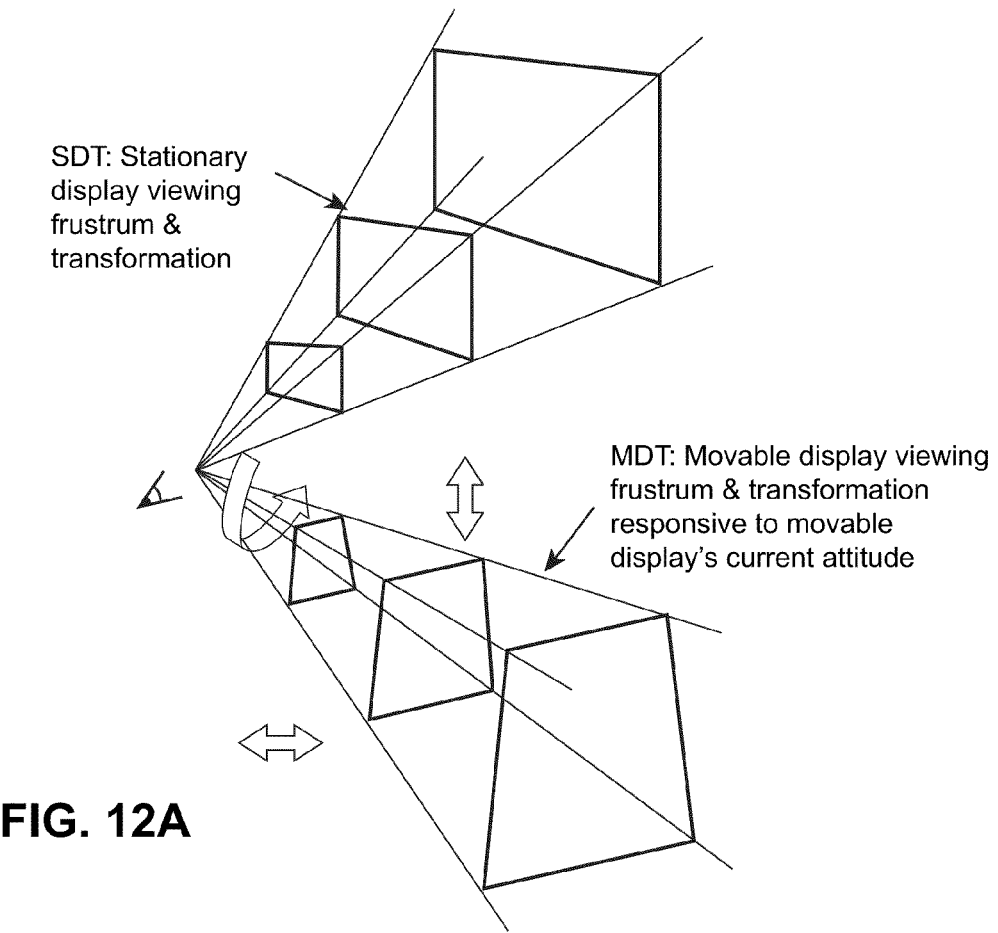
FIG. 12A shows a non-limiting example of a stationary display viewing frustum and transformation, and a movable display viewing frustum and transformation responsive to a movable display's current attitude.

FIG. 12 is a flowchart of software instructions at least portions of which are stored in non-transitory storage device 104 of movable display MD and/or within a non-transitory storage device associated with remote computer G (for more details see U.S. patent application Ser. Nos. 13/019,924 and 13/019,928 filed on Feb. 2, 2011, the contents of which are incorporated herein by reference in their entirety). In the example shown, Viewpoint/Frustum of Virtual 3D World For Stationary Display (SD) is defined (block 120) (e.g., based on inputs from user controls on the movable display MD and/or on other user input devices such as the Wii Remote Plus and Nunchuk shown in FIG. 8A, 8B). Sensors T then acquire the attitude of movable display MD (block 122), and a Viewpoint/Frustum of Virtual 3D World For Movable Display (MD) is defined (block 124). Then, system S uses conventional high speed interactive computer graphics hardware and software to project a 3D World onto the stationary display (SD) based on the viewpoint/frustum defined for the stationary display (block 126), and the 3D world is also projected onto the movable display (MD) based on the viewpoint/frustum defined for the movable display (block 128). Block 128 can use some or all aspects of the acquired attitude of movable display MD to change the transformation(s) used to project the 3D virtual space onto the movable display MD. Such use of acquired attitude may be in any desired way such as by altering viewpoint, viewing angle, field of view, scale, rotation, viewing frustum, type of projection, texture mapping, special effects or any other aspect of the graphics processing and calculation(s) used to obtain a display view from the 3D virtual space. As one non-limiting example, block 128 can change the direction and/or orientation of view based on the determined orientation of movable display MD relative to the earth's magnetic field. FIG. 12A illustrates a stationary display viewing frustum and transformation SDT and a moving display viewing frustum and transformation MDT. This non-limiting example shows that aspects of the moving display viewing frustum and transformation MDT (e.g., the rotational, positional and scaling aspects of the transformation) used to generate the image to be displayed on the movable display MD may be determined by the current attitude of the movable display. Of course, the stationary display viewing frustum and transformation SDT need not be fixed. In some applications, this stationary display viewing frustum and/or transformation may change in response to user inputs, a software program, etc. In some example applications, it may be desirable to use the same or substantially the same viewpoint, location, neighborhood, region and/or vicinity within the 3D virtual world defining the two viewing frustums and transformations. In this way, system S can present the user with two different views of the 3D virtual space as might be seen from the same or similar vantage point within the 3D virtual space. In terms of the "same" or similar location, some application may not use the exact same location for the two different views, but might instead for example use a slightly higher position to give a more overview to one of the screens. Other possibilities for the same or similar location, region, neighborhood and/or vicinity include:

higher or lower position
forward position or further back
looking slightly up or down (pitch)
zoomed out or in.
slightly rolled or yawed
positioned slightly left or right
other differences.

In other applications, different viewpoints, location, neighborhood, region and/or vicinity within the 3D virtual world can be used to generate images for display by the stationary display SD and movable display MD, respectively.

Figure 12B:
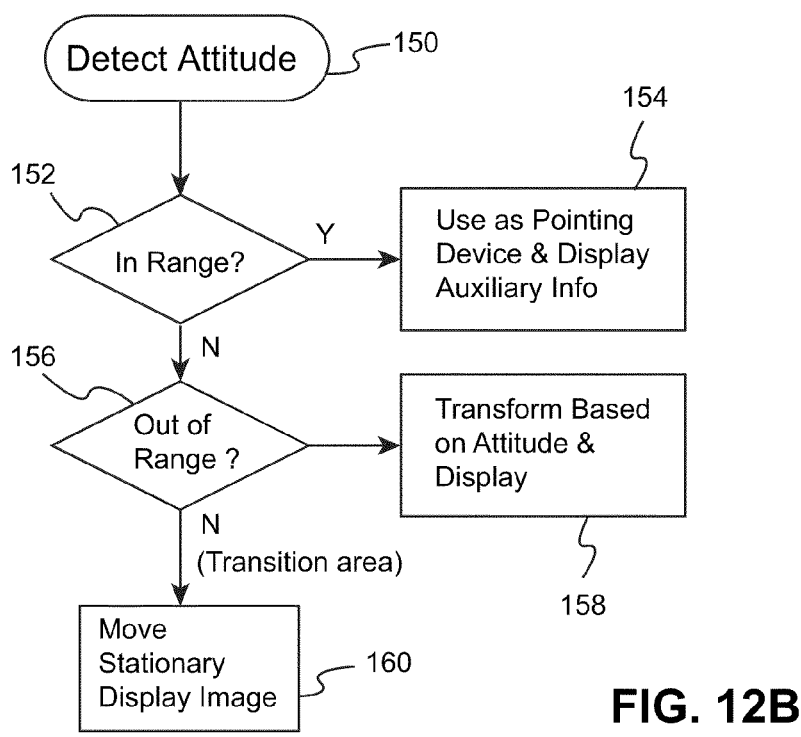
FIG. 12B shows a further non-limiting processing flowchart.

FIG. 12B shows example steps performed by program instructions stored in non-transitory memory to switch the movable display between contexts. In one example non-limiting implementation, system S detects the attitude of the movable display (block 150) and determines whether a vector normal to the plane of the display surface or housing of movable display MD intersects an imaginary surface that bounds the stationary display SD. The imaginary surface may be a rectangle, bounding box, sphere, plane, or any other surface. If intersection is found (indicating the relative orientations or postures of the movable and stationary displays MD, SD falls within a certain range and thus that the movable display is pointing at a region in space where the stationary display SD is likely to be) (block 152), then system S infers that the user intends to use movable display MD as a pointing device to point at (or otherwise interact with) stationary display SD ("in-range" or auxiliary display context). In such case, the system S uses the movable display as a pointing device (e.g., to control the position of a pointing symbol displayed on the stationary display SD) and may also display auxiliary information on the movable display (block 154). If no intersection is found ("out-of-range" or lookabout context) (block 156), system S instead causes the movable display MD to present an image of the virtual world from a viewing direction corresponding to the movable display's attitude (block 156). In either case, if the intersection is within a border or peripheral area ("transition area") (block 160), then one or the other or both of displays MD, SD may display a visual effect (e.g., move or scroll the display) indicating this border, marginal or peripheral condition (block 160).

The FIG. 12, 12B process may continually repeat many times to produce a sequence of e.g., animated images that update interactively in real time as the user moves movable display MD in free space. In some implementations, each of steps in these figures may be performed in the remote computer G. In other implementations, the steps are performed by the processor 102 of movable display MD. In still other implementations, some or all of the steps may be performed by a processor within or associated with the stationary display SD. In still other non-limiting implementations, some or all of the steps may be performed by one or more accessory devices such as shown in FIGS. 8A-8B.

As shown in FIGS. 9A and 9B, in some example arrangements the movable display MD can be attached to an accessory such as a handheld plastic gun or other aiming aid. The gun G shown in FIG. 9A includes a CMOS sensor (e.g., of the type found within a conventional Nintendo Wii Remote Plus) for detecting a set-top sensor IR bar, which can be used as a fiducial or reference source for an absolute measurement. The CMOS sensor viewing frustum may be limited, but many or most "shooter" and pointing type applications are performed by facing towards the stationary display SD. These two optical (IR) set-top lighthouses or beacons would help to simplify or even eliminate the initial calibration or recalibrations. One example non-limiting more comprehensive usage would be MARG+optical (e.g., CMOS sensor), which would provide a combination of inertial, optical and magnetic position and orientation sensing. Such outputs can be fused or combined e.g., using Kalman filtering or other techniques as described in Welch et al (cited above) to achieve a fused result. In the example movable display MD not using the accessories shown in FIG. 9A, 9B, there is no optical direct pointing device, which would have been the only reference source for the absolute measurement related to TV screen location. In such applications, system S provides attitudinal spatial correlation only between the two displays MD, SD and does not provide any absolute or relative positional spatial correlation.

While the technology herein has been described in connection with exemplary illustrative non-limiting embodiments, the invention is not to be limited by the disclosure. For example, given the conceptual nature of the present disclosure and its detailed exploration of a variety of different possible implementations, many statements herein do not correspond to any particular actual product that may be eventually be made available to consumers. Additionally, while the preferred embodiments use a stationary display SD and a movable display MD, both displays could be movable or both could be stationary, or there could be more displays some of which are movable and some of which are stationary. One or both the displays SD and MD may a 3D display (e.g., an autostereoscopic display) that provide stereoscopic perception of depth to a viewer. One or both of the displays SD and MD may be so-called high-definition displays (e.g., 1,280× 720 pixels (720p) or 1,920×1,080 pixels (1080i/1080p)). Still additionally, the images displayed on the displays SD and MD may be from any source such as an animation engine, a video game machine, a simulator, or a video which is appropriately transformed or processed to provide displays from different perspectives. The invention is intended to be defined by the claims and to cover all corresponding and equivalent arrangements whether or not specifically disclosed herein.

We claim:

1. An immersive spatial human-machine interface comprising:
   at least one handheld display movable in free space;
   an arrangement configured to determine at least some aspects of the attitude of the movable handheld display;
   at least one additional display; and
   at least one graphical image generator operatively coupled to the handheld display and the additional display, the at least one graphical image generator generating images of a virtual space for display by the handheld display and the additional display,
   wherein the at least one graphical image generator generates images of different perspectives viewed from a same virtual location for display by the handheld display and the additional display, at least some of said images generated at least in part in response to the determined attitude aspects to provide spatial correlation between the handheld display and additional display images and thereby enhance the immersive spatiality of the human-machine interface.

2. The interface of claim 1 wherein during a mode when the handheld display and additional display images are similar, the at least one graphical image generator substitutes other images and/or information for display by the handheld display.

3. The interface of claim 2 wherein during a mode when the perspective for the handheld display and the perspective for the additional display is substantially the same or close, the at least one graphical image generator substitutes other images and/or information for display by the handheld display.

4. The interface of claim 1 wherein the additional display comprises a stationary display, and the at least one graphical image generator does not practically alter, except for possible marginal lookaround perspective shifts, the rendering perspective for images generated for the stationary display based on the determined attitude aspects.

5. The interface of claim 4 wherein the at least one graphical image generator alters the rendering perspective for images generated for the stationary display in cases of marginal look-about perspective shifts.

6. An immersive spatial human-machine interface comprising:
   at least one handheld display movable in free space;
   an arrangement configured to determine at least some aspects of the attitude of the movable handheld display;
   at least one additional display; and
   at least one graphical image generator operatively coupled to the handheld display and the additional display, the at least one graphical image generator generating different images from a common or nearby location within a virtual space for respective display by the handheld display and the additional display,
   wherein the at least one graphical image generator generates images for different viewing directions from the common or nearby location within the virtual space for display by the handheld display and the additional display, at least the images generated for display by the movable display being responsive to the determined attitude aspects to provide spatial correlation between the images displayed by the handheld and additional displays and thereby enhance the immersive spatiality of the human-machine interface.

7. The interface of claim 6, wherein an image for the handheld display represents at least a part of the virtual space which is not represented in an image for display by the additional display.

8. The interface of claim 6, wherein the graphical image generator generates images of a reference viewing directions for display by the additional display and an image of a different/free/arbitrary viewing direction which alters according to the determined attitude aspects for display by the handheld display, the different/free/arbitrary viewing direction being based on the reference direction.

9. The interface of claim 8 wherein the graphical image generator generates images for display by each of the handheld display and the additional display so that an image for the handheld display represents at least a part of the virtual space which is not represented in an image for display by the additional display when the determined attitude aspects are out of the range corresponding to the additional display.

10. The interface of claim 6 wherein the graphical image generator generates images for display by each of the handheld display and the additional display so that an image for the handheld display represents at least a part of the virtual space which is not represented in an image for display by the additional display when the determined attitude aspects correspond to a predetermined attitude.

11. The interface of claim 6, wherein the graphical image generator generates images for display by the handheld display using a virtual camera for the handheld display and images for display by the additional display using a virtual camera for the additional display, and wherein the graphical image generator alters the viewing direction of the virtual camera for the handheld display according to the determined attitude aspects substantially without altering the viewing direction of the virtual camera for the additional display.

12. The interface of claim 11, wherein the position of the virtual camera for the handheld display and the position of the virtual camera for the additional display are substantially the same.

13. The interface of claim 12, wherein the virtual camera position is determined based on the position of a player object, which is changed by an operation of a player.

14. The interface of claim 6, wherein the graphical image generator communicates wirelessly with the handheld display.

15. The interface of claim 6, wherein the graphical image generator is a single information processing unit, and wherein the information processing unit generates substantially simultaneously both images for the handheld display and images for the additional display.

16. The interface of claim 6 wherein the additional display comprises a stationary display, and the graphical image generator does not alter the rendering viewpoint for images generated for the stationary display based on the determined attitude aspects.

17. The interface of claim 6 wherein the movable display comprises a MARG sensor arrangement to determine attitude.

18. The interface of claim 6 wherein the graphical image generator modifies projection viewpoint in response to the determined attitude aspects of the movable display.

19. The interface of claim 6 wherein the handheld display is enclosed in a housing, and the arrangement is disposed within the housing.

20. The interface of claim 6 wherein the handheld display comprises a touch display.

21. The interface of claim 6 wherein the arrangement includes at least one magnetometer.

22. The interface of claim 6 wherein the arrangement includes at least one element selected from (a) accelerometer, (b) gyroscope, (c) magnetometer, (d) optical, (e) ultrasonic, (f) infrared.

23. The interface of claim 6 wherein the arrangement is outside-looking-in.

24. The interface of claim 6 wherein the arrangement is inside-looking-out.

25. The interface of claim 6 wherein the movable handheld display displays a 3D movable patch of the virtual space that is spatially correlated with the image displayed by the additional display.

26. The interface of claim 6 wherein the movable handheld display displays 3D images.

* * * * *